United States Patent
Frenger et al.

(10) Patent No.: US 10,939,364 B2
(45) Date of Patent: Mar. 2, 2021

(54) RADIO NETWORK NODE, WIRELESS DEVICE AND METHODS FOR SYSTEM INFORMATION TRANSMISSION

(71) Applicant: Telefonaktiebolaget LM Ericsson (publ), Stockholm (SE)

(72) Inventors: Pål Frenger, Linköping (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/491,204

(22) PCT Filed: May 9, 2018

(86) PCT No.: PCT/SE2018/050483
§ 371 (c)(1),
(2) Date: Sep. 5, 2019

(87) PCT Pub. No.: WO2018/208214
PCT Pub. Date: Nov. 15, 2018

(65) Prior Publication Data
US 2020/0236613 A1 Jul. 23, 2020

Related U.S. Application Data

(60) Provisional application No. 62/505,146, filed on May 12, 2017.

(51) Int. Cl.
*H04W 4/00* (2018.01)
*H04W 48/14* (2009.01)
(Continued)

(52) U.S. Cl.
CPC .......... *H04W 48/14* (2013.01); *H04B 7/0617* (2013.01); *H04W 72/0413* (2013.01);
(Continued)

(58) Field of Classification Search
CPC . H04W 48/14; H04W 72/0413; H04W 88/02; H04W 8/245; H04B 7/0617; H04M 1/72519; H04M 1/72522
(Continued)

(56) References Cited

U.S. PATENT DOCUMENTS 6,330,459 B1 * 12/2001 Crichton ............... H04W 16/28
455/434
8,553,715 B2 * 10/2013 Takano .................. H04B 7/088
370/339
(Continued)

FOREIGN PATENT DOCUMENTS

WO 2016023854 A1 2/2016
WO 2018195841 A1 11/2018

OTHER PUBLICATIONS

"Discussion on indicating the broadcast of on-demand SIBs", 3GPP TSG-RAN WG2 Meeting #97bis; R2-1703140; Spokane, USA, Apr. 3-7, 2017, pp. 1-4.
(Continued)

*Primary Examiner* — Danh C Le
(74) *Attorney, Agent, or Firm* — Murphy, Bilak & Homiller, PLLC

(57) ABSTRACT

Embodiments herein relate to e.g. a method performed by a radio network node (12) for handling system information of a wireless communication network. The radio network node receives, from a wireless device (10), a 5 request for transmission of at least a part of the system information, wherein the request is associated with an indication indicating that the request is for a transmission of the at least part of the system information. The radio network node further transmits, in a transmission, the requested at least part of the system information to the wireless device, wherein one or more properties of 10 the transmission are adapted based on the received request; and wherein the transmission is beam-
(Continued)

formed towards the wireless device and/or the transmission is performed within a time interval from the received request.

10 Claims, 15 Drawing Sheets

(51) Int. Cl.
| | | |
|---|---|---|
| *H04B 7/06* | (2006.01) | |
| *H04W 72/04* | (2009.01) | |
| *H04M 1/725* | (2021.01) | |
| *H04W 88/02* | (2009.01) | |

(52) U.S. Cl.
CPC .... *H04M 1/72519* (2013.01); *H04M 1/72522* (2013.01); *H04W 88/02* (2013.01)

(58) Field of Classification Search
USPC ...................................... 455/434, 550.1, 418
See application file for complete search history.

(56) References Cited

U.S. PATENT DOCUMENTS

| 10,009,797 | B2* | 6/2018 | Zander | H04J 11/00 |
|---|---|---|---|---|
| 2013/0150022 | A1* | 6/2013 | Lee | H04W 84/18 455/422.1 |
| 2017/0366236 | A1* | 12/2017 | Ryoo | H04B 7/0421 |
| 2018/0013524 | A1* | 1/2018 | Chien | H04W 48/12 |
| 2018/0049167 | A1* | 2/2018 | Islam | H04B 7/088 |
| 2018/0199267 | A1* | 7/2018 | Lin | H04W 48/10 |
| 2018/0220288 | A1 | 8/2018 | Agiwal et al. | |
| 2018/0227962 | A1* | 8/2018 | Mallick | H04W 56/0015 |
| 2018/0317264 | A1* | 11/2018 | Agiwal | H04W 52/36 |
| 2018/0343679 | A1* | 11/2018 | Sahlin | H04W 48/10 |
| 2019/0037604 | A1* | 1/2019 | Akkarakaran | H04W 74/004 |
| 2019/0174554 | A1* | 6/2019 | Deenoo | H04W 16/14 |
| 2019/0215828 | A1* | 7/2019 | Kim | H04W 72/0426 |
| 2019/0229789 | A1* | 7/2019 | Zhang | H04B 7/0617 |
| 2019/0261251 | A1* | 8/2019 | Lindheimer | H04W 48/02 |
| 2019/0268922 | A1* | 8/2019 | He | H04W 72/1263 |
| 2020/0008132 | A1* | 1/2020 | Hong | H04W 4/06 |
| 2020/0137528 | A1* | 4/2020 | Al | H04W 48/12 |

OTHER PUBLICATIONS

"Procedures for on demand SI", 3GPP TSG-RAN WG2 #97; R2-1701389; Athens, Greece, Feb. 13-17, 2017, pp. 1-3.

"System Information Signalling Design in NR", 3GPP TSG-RAN WG2 Meeting #95; R2-164693; Gothenburg, Sweden, Aug. 22-26, 2016, pp. 1-6.

"Design on MSG1 based request and failure handling", 3GPP TSG-RAN WG2 #98; R2-1705175; Hangzhou, China, May 15-19, 2017, pp. 1-3.

"Report of email discussion on [94#40][NR] System information", 3GPP TSG-RAN WG2 95; R2-165201; Gothenburg, Sweden, Aug. 22-26, 2016, pp. 1-31.

"On Demand SI: Further Details of MSG1 Approach", Samsung, 3GPP TSG-RAN WG2 Meeting #98, R2-1704049, Hangzhou, China, May 15-19, 2017, pp. 1-6.

"Remaining issues of On-demand SI", Ericsson, 3GPP TSG-RAN WG2 #98, R2-1704385, Hangzhou, P.R. of China, May 15-19, 2017, pp. 1-7.

* cited by examiner

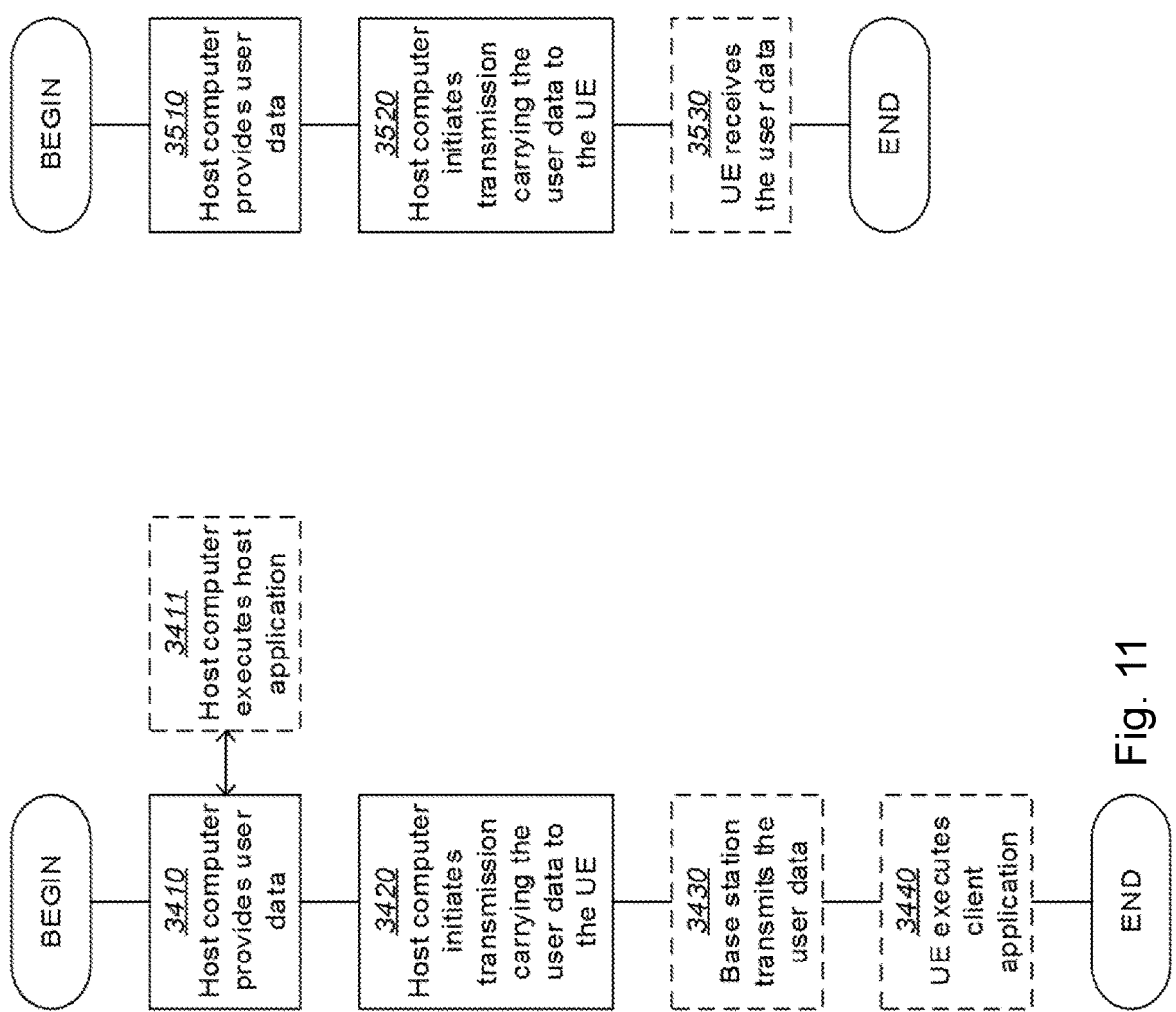

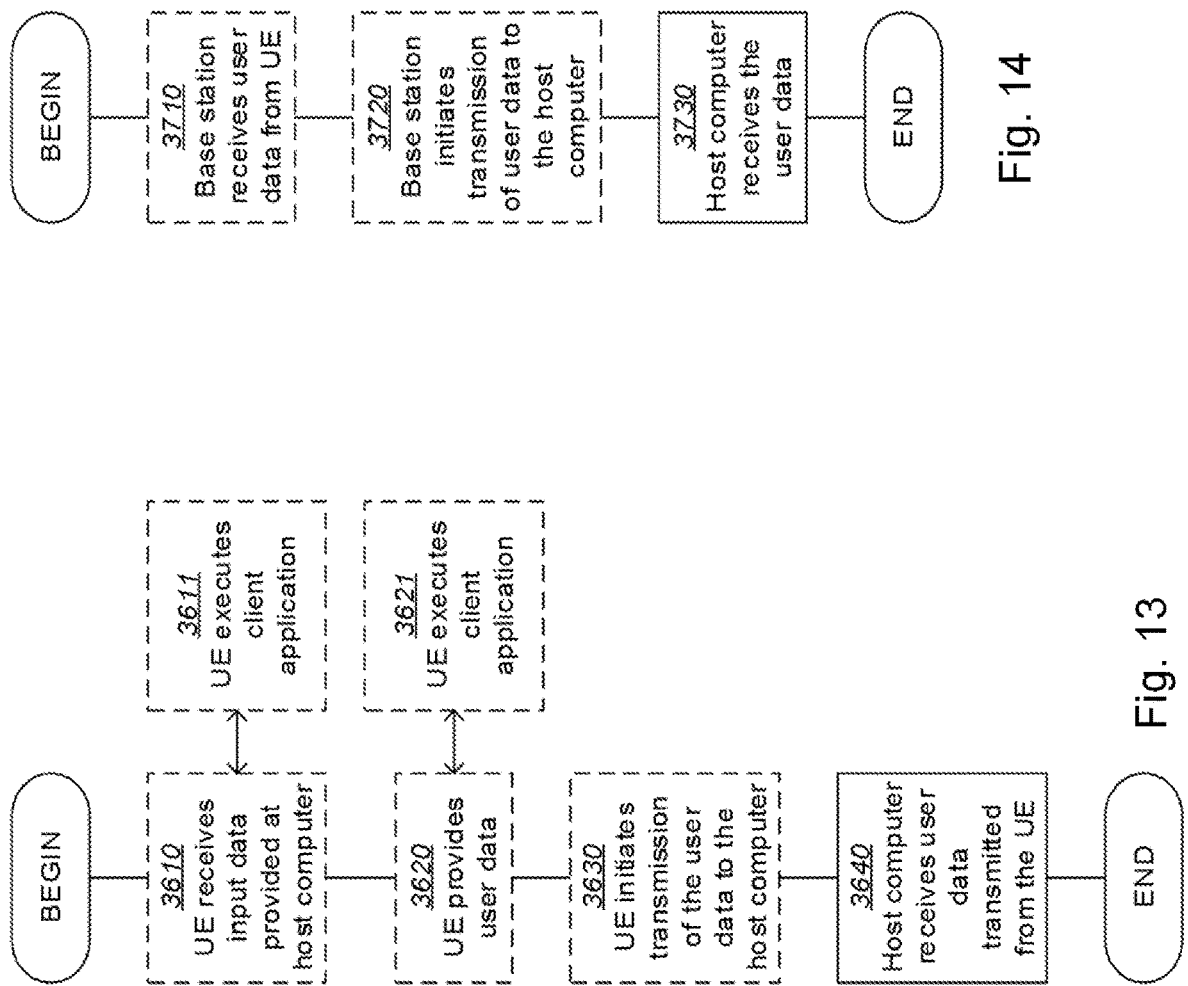

RADIO NETWORK NODE, WIRELESS DEVICE AND METHODS FOR SYSTEM INFORMATION TRANSMISSION

TECHNICAL FIELD

Embodiments herein relate to a radio network node, a wireless device and methods performed therein. Furthermore, a computer program product and a computer readable storage medium are also provided herein. In particular, embodiments herein relate to enable communication of the wireless device e.g. handling system information, in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area and provides radio coverage over service areas or cells, which may also be referred to as a beam or a beam group, with each service area or beam being served or controlled by a radio network node such as a radio access node e.g., a Wi-Fi access point or a radio base station (RBS), which in some networks may also be denoted, for example, a NodeB, an eNodeB, or a gNodeB. The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

For the 5G system, where the radio access network may be referred to as New Radio (NR) and the core network may be referred to as Next Generation Core (NGC), 3GPP has agreed to partly change the principles for distribution of system information (SI) that are used in LTE.

For NR it has been decided to divide the SI into "minimum SI" and "other SI", where the minimum SI is the SI that is required to access the cell. The minimum SI is periodically broadcast in a cell, while the other SI may be SI either periodically broadcast or delivered on demand, e.g. triggered by a random access preamble, also referred to as Msg1, or a random access message 3, also referred to as Msg3, from a wireless device in RRC_IDLE or RRC_INACTIVE state (where RRC_INACTIVE is the "new state" agreed for NR) or requested via Radio Resource Control (RRC) signaling from a wireless device in RRC_CONNECTED state. If random access preamble, i.e. the Msg1, transmissions are used, there may be different preambles for requesting different parts, e.g. System Information Block(s) (SIB) or groups of SIBs, of the other SI. If random access message 3, i.e. the Msg3, transmissions are used, a wireless device may in such a message specify which parts, e.g. certain SIB(s) or groups of SIBs, of the other SI the wireless device wants the network to broadcast/transmit.

With the Msg1 solution, reception of one of the concerned preambles triggers the network to broadcast the requested SIB(s) in accordance with scheduling information in the minimum SI, see FIG. 1a.

With the Msg3 solution the request procedure is in principle a truncated, i.e. shortened, random access procedure, ending with Msg3, which triggers the network to broadcast or transmit the parts of the other SI that are specified in the Msg3 from the wireless device, see FIG. 1b.

It has also been decided to transmit a broadcast channel, denoted NR-Physical Broadcast Channel (NR-PBCH), following a periodic synchronization signal, consisting of the two parts NR-Primary Synchronization Signal (NR-PSS) and NR-Secondary Synchronization Signal (NR-SSS) from which a Physical Cell Identity (PCI) can be derived. Together, the NR-PSS+NR-SSS+NR-PBCH form an entity denoted as a Synchronization Signal (SS) Block. Some of the minimum SI may be broadcast on the NR-PBCH, e.g. denoted Master Information Block (MIB), while the remainder of the minimum SI will be periodically broadcast on another channel, whose properties are yet to be agreed on. A number of SS Block transmissions may be lumped together, i.e. transmitted in a tight series, and may be denoted as a "SS Burst". Furthermore, multiple SS Bursts may be configured to constitute a SS Burst Set.

Further 3GPP agreements with regards to other SI include that the minimum SI may indicate with an indication whether a certain SIB or group of SIBs of the other SI is periodically broadcast in the cell or has to be requested on-demand. For the latter case when being requested, the minimum SI may further include information, e.g. configuration data, that enables a wireless device to request broadcast of the other SI which is not periodically broadcast in the cell. If random access preamble, i.e. the Msg1, transmissions are used to request the network to broadcast the other SI, and different preambles are used to request different parts of the other SI, then the enabling configuration data may include mappings between the different preambles and different parts, e.g. SIB(s) or group(s) of SIBs, of the other SI.

A wireless device needing one or more SIB(s) of the other SI would thus first check the minimum SI to see whether the concerned SIB(s) is(are) indicated, with the indication, as being periodically broadcast or requiring an on-demand request. Note that this indication may be temporarily set to indicate "broadcast" for a certain SIB or group of SIBs as soon as the radio network node receives an on-demand request for the concerned SIB(s), until the transmission of the requested SIB(s) is concluded, which may consist of a single broadcast of each of the SIB(s) or a few periodic broadcasts.

An important property of the coming 5G system, e.g. NR, is the usage of high carrier frequencies, e.g. in the range 6-100 GHz. For such high frequency spectrum, the atmospheric, penetration and diffraction attenuation properties may be much worse than for lower frequency spectrum. In addition, a receiver antenna aperture, which is a metric describing the effective receiver antenna area that collects the electromagnetic energy from an incoming electromagnetic wave, is inversely proportional to the frequency, i.e. a link budget, i.e. a metric accounting of all of gains and losses from the transmitter, through a medium, to the receiver, would be worse for the same link distance even in a free space scenario, if omnidirectional receive and transmit antennas are used. This motivates a usage of beamforming to compensate for the loss of link budget in high frequency spectrum. This is particularly important when communicating with wireless devices with poor receivers, e.g. low cost and/or low complexity wireless devices.

One of the potential benefits of on-demand SI, i.e. request the other SI, may be to speed up the process, to allow a wireless device to receive the other SI faster than instead having to wait for a periodic broadcast. This possibility is not taken into account with the current solution using the regular periodic scheduling of broadcast transmissions, i.e. utilized or non-utilized scheduled broadcast occasions.

Moreover, the scheduled broadcast approach for on-demand of the other SI precludes beamforming, since multiple wireless devices—not just the one requesting the SI—may be listening. This can make it difficult for wireless devices with simple receiver equipment, e.g. low cost, low complexity wireless devices, to receive and decode the transmissions. Alternatively, excessively robust coding, i.e. with a (very) high degree of redundancy, may be used in order to handle also the cases of simpler wireless devices located at the cell edge. General usage of such robust coding means that the SI transmissions cause unnecessarily much overhead and resource usage for the regular cases, i.e. regular wireless devices and/or wireless device's with better channel conditions than at the cell edge, e.g. wireless devices closer to the radio network node antenna site, for which the coding is unnecessarily robust.

SUMMARY

An object herein is to provide a mechanism that improves performance of a wireless communication network in an efficient manner.

According to an aspect the object is achieved by providing a method performed by a radio network node for handling system information of a wireless communication network. The radio network node receives, from a wireless device, a request for transmission of at least a part of the system information, wherein the request is associated with an indication indicating that the request is for a transmission of the at least part of the system information. The radio network node further transmits, in a transmission, the requested at least part of the system information to the wireless device, wherein one or more properties of the transmission are adapted based on the received request. The transmission is beamformed towards the wireless device and/or the transmission is performed within a time interval from the received request.

According to another aspect the object is achieved by providing a method performed by a wireless device for handling system information of a wireless communication network. The wireless device sends to a radio network node, a request for transmission of at least a part of system information associated with the wireless communication network, wherein the request is associated with an indication indicating that the request is for a transmission of the at least part of the system information. The wireless device further receives, within a time period from the request and/or a beamformed transmission from the radio network node, of the at least part of the system information transmitted in response to the sent request.

It is furthermore provided herein a computer program product comprising instructions, which, when executed on at least one processor, cause the at least one processor to carry out any of the methods above, as performed by the wireless device or the radio network node. It is additionally provided herein a computer-readable storage medium, having stored thereon a computer program product comprising instructions which, when executed on at least one processor, cause the at least one processor to carry out the method according to any of the methods above, as performed by the wireless device or the radio network node.

According to another aspect the object is achieved by providing a radio network node for handling system information of a wireless communication network, wherein the radio network node is configured to receive from a wireless device, a request for transmission of at least a part of the system information, wherein the request is associated with an indication indicating that the request is for a transmission of the at least part of the system information. The radio network node is further configured to transmit, in a transmission, the requested at least part of the system information to the wireless device, wherein one or more properties of the transmission are adapted based on the received request; and wherein the transmission is beamformed towards the wireless device and/or the transmission is performed within a time interval from the received request.

According to yet another aspect the object is achieved by providing a wireless device for handling system information of a wireless communication network. The wireless device is configured to send to a radio network node a request for transmission of at least a part of system information associated with the wireless communication network, wherein the request is associated with an indication indicating that the request is for a transmission of the at least part of the system information. The wireless device is further configured to receive within a time period from the request and/or a beamformed transmission from the radio network node, of the at least part of the system information transmitted in response to the sent request.

It is herein disclosed a wireless device comprising processing circuitry configured to send to a radio network node a request for transmission of at least a part of system information associated with the wireless communication network, wherein the request is associated with an indication indicating that the request is for a transmission of the at least part of the system information. The processing circuitry is further configured to receive within a time period from the request and/or a beamformed transmission, from the radio network node the at least part of the system information transmitted in response to the sent request.

It is herein disclosed a radio network node comprising processing circuitry configured to receive from a wireless device, a request for transmission of at least a part of the system information, wherein request is associated with an indication indicating that the request is for a transmission of the at least part of the system information. The processing circuitry is further configured to transmit, in a transmission, the requested at least part of the system information to the wireless device, wherein one or more properties of the transmission are adapted based on the received request; and wherein the transmission is beamformed towards the wireless device and/or the transmission is performed within a time interval from the received request.

Embodiments herein enable the wireless device to request and receive quick and/or beamformed delivery of one or more parts (e.g. SIBs) of the system information available in a cell. The radio network node may in some embodiments coordinate the request opportunities with the scheduled potential transmission occasions of the corresponding requested at least part of SI. The coordination is such that a scheduled potential transmission occasion for requested SI may occur immediately (preferably in the subsequent subframe) after each request opportunity. This minimizes the delay between the request for and delivery of requested SI. The coordination allows various degrees of overall latency, i.e. the delay from the point where the wireless device wants to acquire the SI until it actually receives it, by varying the allocation of the resources for the request. That is, if really low overall latency is to be achieved, the request opportunities may be allocated really frequent; in the extreme case in every subframe.

Optionally, when supported by the radio network node 12, other uplink transmissions than SI requests may be scheduled in the same resources as configured for requests in order to minimize waste of resources, at least when the resources allocated for request of quick SI delivery are different from the regular Physical Random Access Channel (PRACH) resources.

The very short interval between the request and delivery of the at least part of SI also enables the radio network node to beamform the transmission of the requested SI in the direction towards the requesting wireless device.

Embodiments herein address the above described problems and enable quick and/or beamformed delivery of on-demand SI i.e. the requested at least part of SI. Hence, the radio network node is enabled to satisfy both wireless devices requiring fast delivery of certain SIB(s) and wireless devices with poor receiver equipment and/or poor channel conditions. The latter means that the coverage of the SI transmissions may be extended without general usage of excessively robust coding. This leads to an improved performance of the wireless communication network in an efficient manner.

BRIEF DESCRIPTION OF THE DRAWINGS

Embodiments will now be described in more detail in relation to the enclosed drawings, in which:

FIGS. 11-14 are flowcharts illustrating methods implemented in a communication system including a host computer, a base station and a user equipment.

DETAILED DESCRIPTION

Figure 1A:
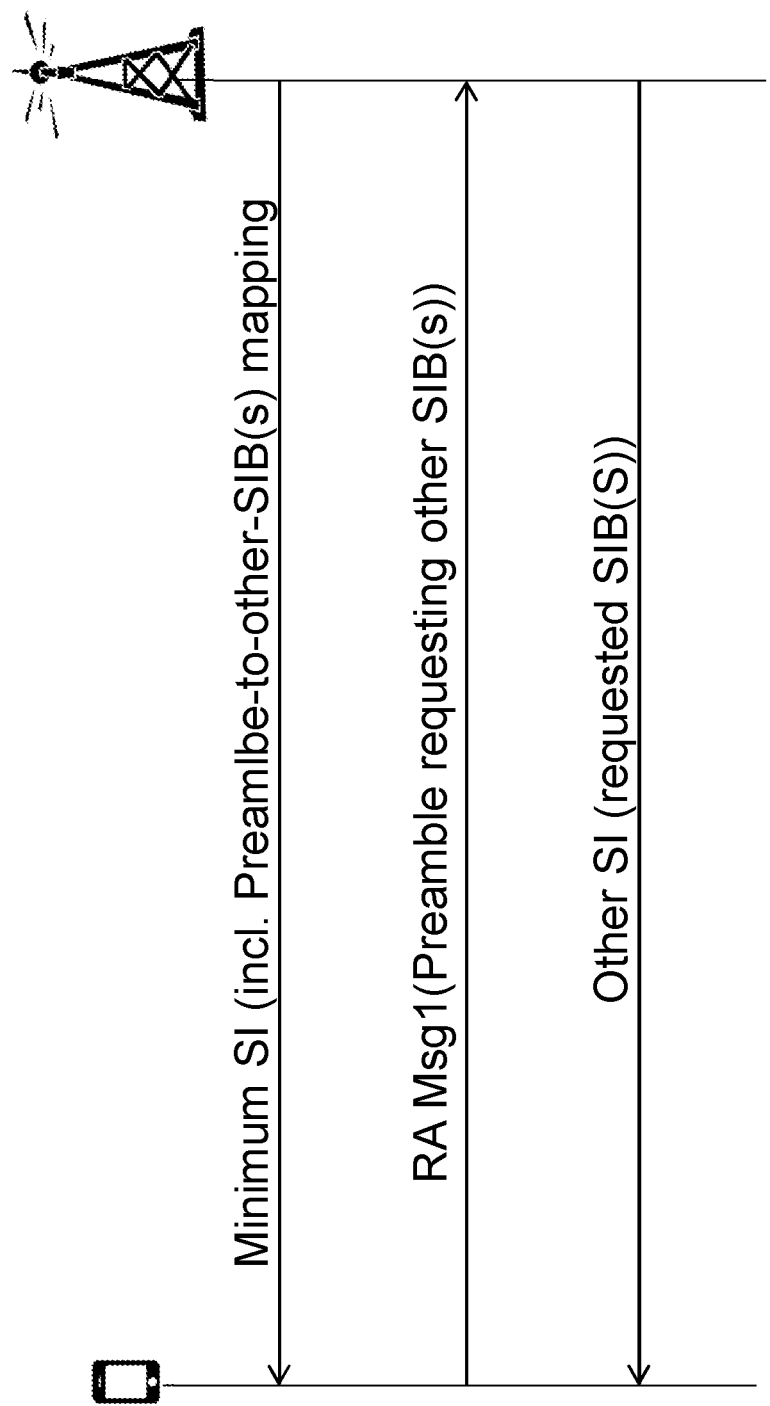
FIG. 1a is a schematic logical overview of a message sequence of the Msg1 solution for requesting broadcast/transmission of other SI.
Figure 1B:
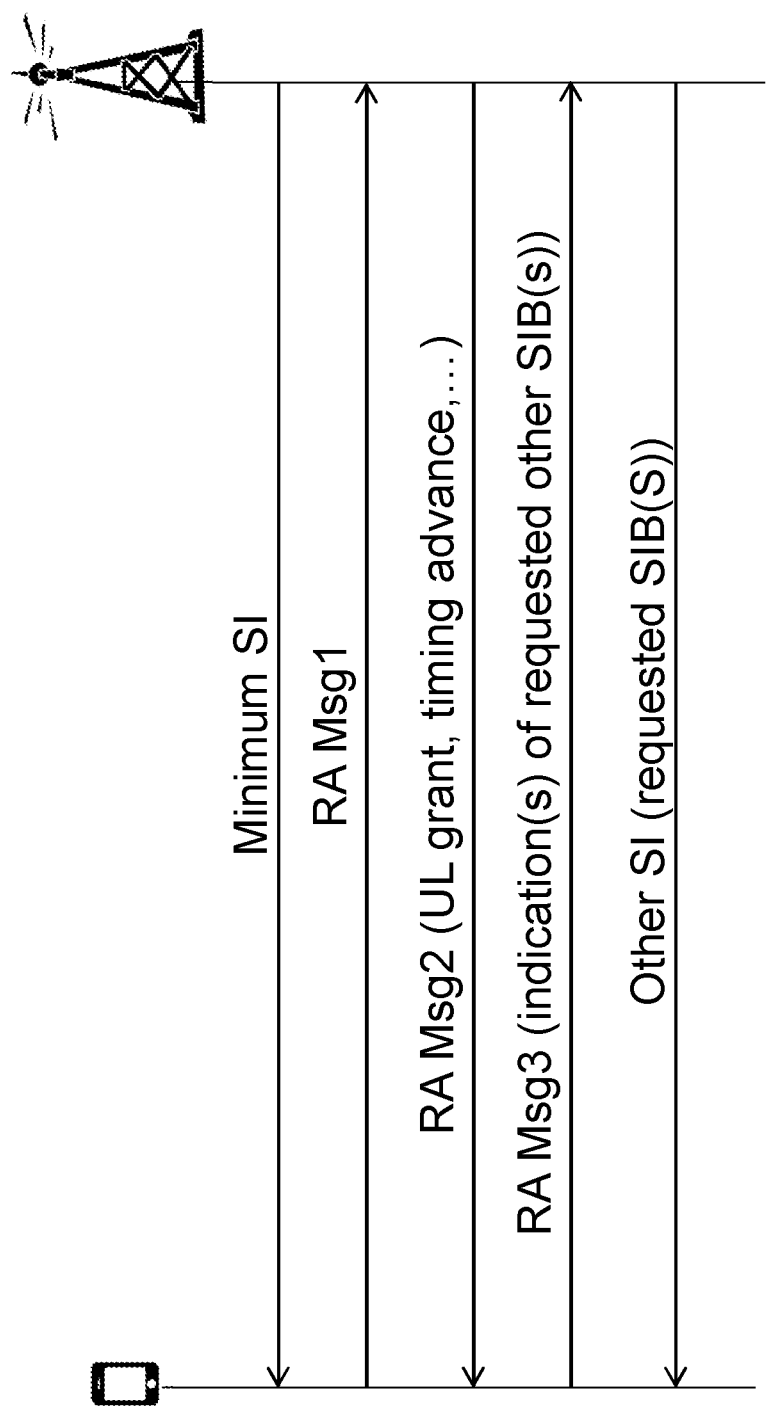
FIG. 1b is a schematic logical overview of a message sequence of the Msg3 solution for requesting broadcast/transmission of other SI.
Figure 2A:
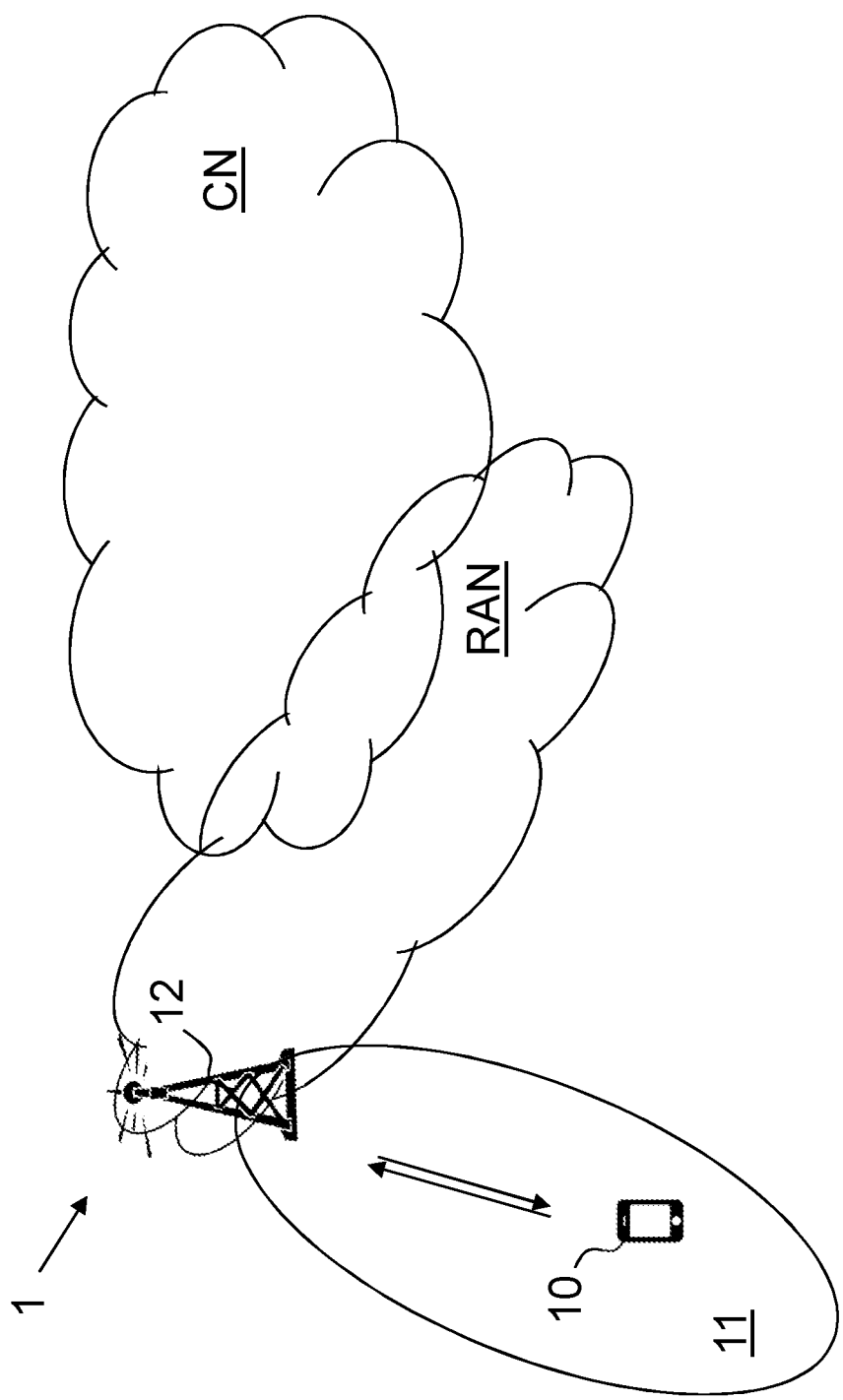
FIG. 2a is a schematic diagram depicting a wireless communication network according to embodiments herein.

Embodiments herein relate to wireless communication networks in general. FIG. 2a is a schematic overview depicting a wireless communication network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (VVCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a wireless device 10, such as a mobile station, a non-access point (non-AP) STA, a STA, a user equipment and/or a wireless terminal, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 communicates with the wireless device 10 with Downlink (DL) transmissions to the wireless device 10 and Uplink (UL) transmissions from the wireless device 10.

Embodiments herein enable the wireless device 10 to request and receive quick and/or beamformed delivery of one or more parts (e.g. SIBs) of the system information available in the cell. For example, according to embodiments herein the radio network node 12 may coordinate one or more opportunities for requests for transmission of at least parts of SI also denoted as on-demand SI requests with one or more scheduled (potential) transmission occasions for corresponding requested at least part of SI. The coordination is such that a scheduled transmission occasion for requested at least part of SI may occur immediately, i.e. within a set time interval e.g. preferably in a subsequent subframe of receiving the request, after each opportunity for a request. This minimizes a delay between the request and delivery of the requested at least part of SI. Embodiments herein allow various degrees of overall latency, i.e. the delay from the point where the wireless device 10 wants to acquire the at least part of SI until it actually receives the at least part of SI, by varying the allocation of the resources for on-demand SI requests. That is, if really low overall latency is to be achieved, the opportunity for a request may be really frequent; in the extreme case in every subframe.

Embodiments herein enable reduced delay of transmissions and this improves the performance of the wireless communication network 1. Moreover, embodiments herein enable the radio network node 12 to beamform the transmission of the requested SI, e.g. based on directional reciprocity, i.e. the requested SI is transmitted in an opposite direction from which the request was received, also referred to as determine or select beam for transmission of the requested SI. The requested SI may be delivered by the radio network node 12 in thus one out of many DL beams such as the DL beam corresponding to an UL beam where the request was received, or the radio network node 12 actually calculates a set of dedicated transmission beamforming weights optimized for the wireless device 10 that sent the request.

It should be noted that there may be different ways of realizing beamforming based on directional reciprocity, where one impacting aspect may be that due to multi-path propagation i.e. the request is reflected, the radio network node 12 may receive a single on-demand SI request transmission from multiple directions, where each such reception could be denoted "signal component". One way to apply directional reciprocity may be to beamform the transmission in the direction from which the strongest signal component is received. Another way may be to "mirror" the received signal components and transmit beams in the directions of each of the received signal components, e.g. the transmitted power is divided between the beam directions in same proportions as the power of the corresponding received signal components. In this case an optional condition may be applied on all but the strongest received signal component, e.g. a minimum power level the signal component must be received with to trigger a mirrored downlink transmission beam in that direction.

The reasons why the embodiments herein are suitable for the beamforming based on directional reciprocity are two-fold:

With a very short (even zero) time interval, i.e. an interval below a threshold, between the request and delivery of the on-demand SI, it is very unlikely that another wireless device will be able to detect the indication in the minimum SI that the on-demand SI will be transmitted, so it is unlikely that any other wireless device will be listening. For this reason, it may even be considered to omit setting the broadcast indication, or broadcast indicator, in the minimum SI.

The very short (even zero) time interval between the request and delivery of the on-demand SI makes the beam direction based on directional reciprocity very reliable, since it is unlikely that the wireless device has had time to move out of coverage of the beam.

Related to the first point above it is not decided exactly how the broadcast indications will be transmitted in the NR standard. Two possible implementation options are to include these broadcast indications in either one of the NR-MIB or in the NR-SIB1. It is also possible that the on-demand broadcast indications will be transmitted in some other way. Regardless how these broadcast indications are transmitted they may be periodically transmitted with a period of several tenths of milliseconds. In case the broadcast of the requested on-demand SI is scheduled to start directly after the request but before the next transmission occurrence of the broadcast indications for the "other SI", then the network may transmit the requested on-demand SI at least once before transmitting any broadcast indications. By timing the opportunities for the on-demand SI request and the transmission of any requested on-demand SI in-between transmissions of the broadcast indications for the "other SI", it is possible to guarantee that the only wireless device(s) that expect the on-demand SI to be transmitted in a particular SI transmission window is the wireless device(s) that performed the on-demand SI request. With this configuration the radio network node 12 may transmit the requested on-demand SI without toggling the associated broadcast indication(s).

A number of variations or extensions may be applied, as described herein.

In yet another embodiment wireless devices may use the regular way of transmitting requests for on-demand SI, which SI is then delivered according to scheduling information in the minimum SI, but all or a subset of the wireless devices are also provided with means to request a quick (low-delay) and/or beamformed delivery of on-demand SI according to embodiments herein. Such means to indicate that the request is for on demand SI, such as a quick (low-delay) and/or beamformed delivery of on-demand SI, may comprise one or more special preambles (for transmission as Msg1), the possibility to include a special indication in Msg3 or specially allocated uplink transmission resources to use for transmission of the request. There could be separate means for requesting quick delivery and requesting beamformed delivery or the provided means could be for requesting both quick and beamformed delivery. Yet an alternative is that there are means for requesting both quick and beamformed delivery, but there are also (in parallel) means for requesting either quick or beamformed delivery. When quick delivery is requested, the radio network node 12 disregards any scheduling information in a minimum SI and instead transmits the requested SI immediately, i.e. with short delay within the set time interval, in response to the request. With this embodiment, the use of the means for requesting quick and/or beamformed SI delivery may be restricted to certain wireless devices or wireless devices in situations where certain conditions are fulfilled. For instance, request for beamformed delivery could be restricted to wireless devices which have poor receiver equipment and/or are experiencing poor downlink channel quality and request for quick delivery could be restricted to wireless devices running Ultra-Reliable Low-Latency Communications (URLLC) applications or other delay sensitive applications. Request for both quick and beamformed delivery could require that conditions for either or both are fulfilled. See examples below for usage restrictions and associated conditions.

An additional feature that may be considered rely on the ability of the radio network node 12 to detect and correctly decode a preamble transmission from the wireless device 10 and another uplink transmission from another wireless device using the same uplink transmission resources simultaneously. This may often be possible and this possibility may be utilized to allow the radio network node 12 to schedule other uplink transmissions in the same resources as have been allocated for on-demand SI requests. In this way, such uplink transmission resources could be configured to occur very frequently without wasting substantial uplink transmission resources.

In some embodiments the wireless device 10 may further request for delivery of non-on-demand SI, i.e. SIBs that are regularly periodically broadcast. The purpose of this would be to receive a fast delivery of the concerned SIB(s) of non-on-demand SI and/or beamforming towards the requesting wireless device for good coverage at the cell edge, especially for a wireless device with simple receiver equipment, e.g. a low cost/low complexity wireless device, such as certain Machine Type Communication (MTC) devices, e.g. simple ubiquitously deployed sensor devices.

When used for quicker delivery of regularly periodically broadcast SIB(s), the wireless device 10 may choose to use whichever is the fastest of sending an on-demand request with a quick response/delivery at the next available occasion, i.e. when uplink transmission resources are scheduled for this purpose, or waiting for the next regular periodic broadcast of the concerned SIB(s) of non-on-demand SI.

Embodiments herein may be used to enable beamforming towards the requesting wireless device 10. This may be useful in cases where fast delivery is not needed, but the wireless device 10 has poor conditions for receiving broadcast transmissions, e.g. because the wireless device 10 is located at the cell edge and/or has poor/simple receiver equipment. The beamforming-enabling on-demand request may then be used both for on-demand SI and regularly periodically broadcast SI being denoted as the other SI.

The request may be associated with the indication indicating that the request is for the transmission of the at least part of the system information. The indication may be e.g. a special preamble or a special indication in Msg3 and may be used to inform the radio network node that the request does not require fast delivery but that beamforming is needed. An alternative of the indication may be to use specially allocated uplink transmission resources for the request.

The use of this feature may be restricted to certain wireless devices and/or situations fulfilling certain conditions, e.g. wireless devices with simple receiver equipment (e.g. low cost/low complexity wireless devices) and/or wireless devices experiencing poor downlink channel conditions, e.g. in terms of Reference Signal Received Power (RSRP), Signal to Noise ratio (SNR) or Signal to Interference plus Noise Ratio (SINR). Another example of a situation/condition which may motivate use of the feature (and when the wireless device is allowed to do it) is when the wireless device 10 has failed to receive a certain number of regular periodic broadcasts of SI, or a certain part of the SI, such as certain SIB(s).

Embodiments herein may be used to achieve fast delivery of the requested SIB(s). An advantage of not requiring beamforming towards the requesting wireless device 10 is that then the radio network node 12 is not required to support directional reciprocity.

The use of the feature of requesting SI may be restricted to certain wireless devices or certain conditions. This may be particularly useful to reduce the number of requests and deliveries when the feature can be used also for non-on-demand SI, i.e. for periodically broadcast SI. It may also be particularly useful when special uplink transmission resources are allocated for this purpose and the radio network node 12 also schedules other uplink transmissions in the same uplink transmission resources.

Examples of what the use of the feature may be restricted to include:
  certain wireless device categories or wireless devices with certain capabilities.
  wireless devices with poor receiver equipment, including antenna(s), e.g. low cost/low complexity wireless devices such as MTC devices.
  wireless devices with certain requirements, e.g. URLLC wireless devices.
  wireless devices running certain applications or applications with certain requirements, e.g. URLLC applications or other delay sensitive applications.
  wireless devices requiring certain on-demand SIB(s) which is(are) related to a certain service (or services), which may be time sensitive.
  wireless devices experiences poor downlink radio channel quality, e.g. in terms of RSRP, SNR and/or SINR, e.g. wireless devices located at the cell edge.
  When the wireless device has failed to receive a certain number of regular periodic broadcasts of SI (or a certain part of the SI, such as certain SIB(s)).
  Various combinations of any of the above.

To save resources when resources for uplink transmission of on-demand SI requests are allocated the resource allocation may be kept close to or below the minimum resource allocation, e.g. in terms of bandwidth such as number of resource blocks, resource elements and/or subcarriers, that would be needed to achieve sufficient coverage in the entire area the cell is intended to cover, e.g. realized as a special "lean" physical channel. As a result, some wireless devices close to the cell edge, or which otherwise have poor channel conditions, may not be able to transmit on-demand SI requests with enough power to reach the radio network node.

In order not to prevent some wireless devices from transmitting on-demand SI requests, these uplink transmission resources may be allocated in addition to regular transmission resources for on-demand SI requests. For instance, regular transmission resources for on-demand SI request may be regular PRACH resources, or may be allocated with a recurrence period on the same timescale as regular PRACH resources, while the "leaner" on-demand SI request transmission resources may be allocated more frequently. A wireless device with poor channel conditions may choose to use the regular on-demand SI request transmission resources, e.g. determined based on channel quality measurements, or may choose to first attempt to use the (more frequent) "lean" on-demand SI request transmission resources, but fall back to using the regular on-demand SI request transmission resources, if no response is received, i.e. the requested on-demand SI is not delivered, on the request transmitted on the "lean" resources. The wireless device 10 may e.g. use the strategy to use any "lean" transmission resources for an on-demand SI request that occurs before the first occurrence of regular on-demand SI request transmission resources and use this first occurrence of on-demand SI request transmission resources if no response to the preceding on-demand SI request transmission(s) has been received.

As an additional option, the wireless device 10, e.g. being a wireless device located at or close to the cell edge e.g. within a certain range of the cell border, may repeat its on-demand SI request (e.g. preamble) transmission in multiple subsequent allocated "lean" resources, in order to allow the radio network node 12 to collect enough energy from the multiple transmissions to properly decode it.

As the "lean" (e.g. frequent) resources cannot always be utilized, this optional embodiment of allocating on-demand SI request transmission resources more frequently may be seen as an optimization for wireless devices, whose channel conditions are better than at the cell edge.

Embodiments herein enable the wireless device 10 to request and receive quick and/or beamformed delivery of one or more parts, e.g. SIBs, of the system information available in a cell.

Figure 2B:
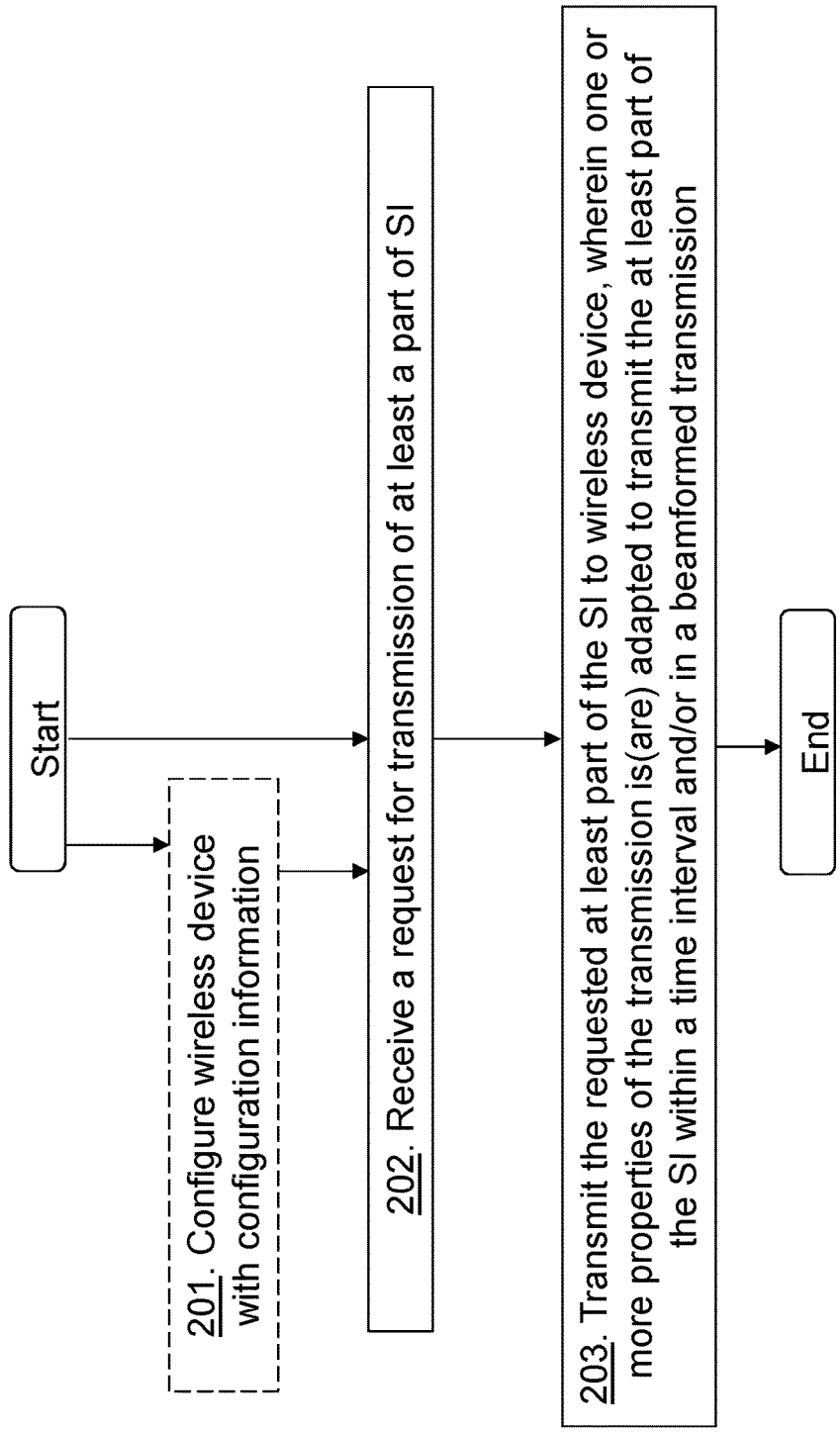
FIG. 2b is a flowchart depicting a method performed by a radio network node according to embodiments herein.

The method actions performed by the radio network node 12 for handling system information of the wireless communication network 1 according to embodiments will now be described with reference to a flowchart depicted in FIG. 2b. Actions performed in some embodiments are marked with dashed boxes.

Action 201. The radio network node 12 may configure the wireless device 10 with configuration information for requesting transmission of the at least part of system information, wherein one or more properties of the transmission are adapted to the request. The radio network node may further allocate one or more uplink transmission resources for the request, which one or more uplink transmission resources are allocated in relation to one or more downlink transmission resources for the at least part of system information.

Action 202. The radio network node 12 receives, from the wireless device 10, the request for transmission of at least a part of the system information. The request is associated with an indication, e.g. comprised in the request or the request uses certain resources, indicating that the request is for a transmission of the at least part of the system information. The indication may be a radio resource, e.g. a preamble and/or time and frequency resource, indicating that the request is for a transmission of the at least part of the system information, or indicating that the request is for a transmission of the at least part of the system information with a value, e.g. a flag in an information element. The indication may further indicate that the at least part of the system information is requested transmitted beamformed and/or requested delivered within the time interval. The at least part of the system information may be the other SI such as SIB1, SIB4 or similar.

Action 203. The radio network node 12 transmits, in a transmission, the requested at least part of the system information to the wireless device 10, wherein one or more properties of the transmission are adapted based on the received request. The transmission is beamformed towards the wireless device 10 and/or the transmission is performed within a time interval from the received request. The one or more properties of the transmission may e.g. be adapted to beamform the transmission in a direction from which the request was received, and/or the one or more properties of the transmission may e.g. be adapted to transmit the transmission within the time interval. Some transmissions may use a beamforming optimized for a group of wireless devices, e.g. using a cell beam, and some transmissions may be optimized for only the wireless device 10, i.e. using a dedicated beam.

Figure 2C:
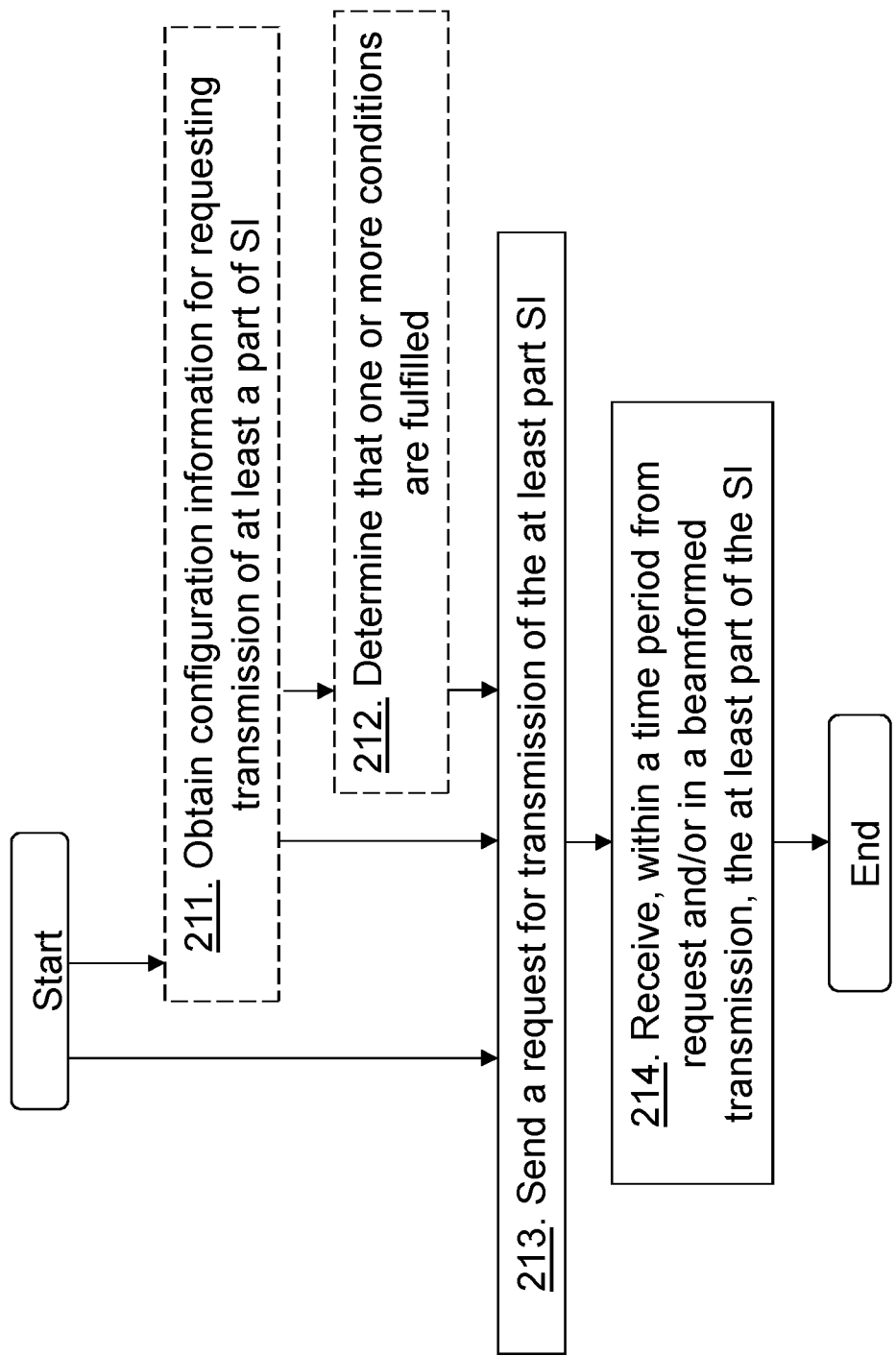
FIG. 2c is a flowchart depicting a method performed by a wireless device according to embodiments herein.

The method actions performed by the wireless device 10 for handling system information of the wireless communication network 1 according to embodiments will now be described with reference to a flowchart depicted in FIG. 2c. Actions performed in some embodiments are marked with dashed boxes.

Action 211. The wireless device 10 may obtain, e.g. receive from the radio network node or be preconfigured with, configuration information for requesting transmission of the at least part of the system information associated with the wireless communication network 1.

Action 212. The request may be sent upon fulfillment of one or more conditions. Thus, the wireless device 10 may determine that the one or more conditions are fulfilled when the wireless device 10 matches a set condition or a strength or quality or quality indication exceeds a threshold. The one or more conditions may be determined fulfilled by concluding one or more of:

the wireless device's category matches a set category,
the wireless device's capability matches a set capability,
the wireless device is running an application that matches a set application,
the at least part(s) of the system information the wireless device intends to request matches a set part of the system information,
radio channel quality experienced by the wireless device matches a set radio channel quality,
the wireless device has failed to receive the at least part of SI or other system information transmissions a number of times that match or exceeds the set number of times.

Action 213. The wireless device 10 sends to the radio network node 12 the request for transmission of at least a part of system information associated with the wireless communication network. The request is associated with the indication indicating that the request is for a transmission of the at least part of the system information. The indication may be a radio resource, e.g. a preamble and/or time and frequency resource, indicating that the request is for a transmission of the at least part of the system information, or indicating that the request is for a transmission of the at least part of the system information with a value, e.g. a flag in an information element. The indication may further indicate that the at least part of the system information is requested as transmitted beamformed to the wireless device 10 and/or requested as delivered within the time period. The request may be sent in accordance with the received configuration information.

Action 214. The wireless device 10 receives, within a time period from the request and/or a beamformed transmission from the radio network node, of the at least part of the system information transmitted in response to the sent request. The time period may be different than the time interval since the period is defined from transmission of the request to the reception of the at least part of SI and the time interval is defined from the reception of the request and transmission of the at least part of SI.

Figure 3:
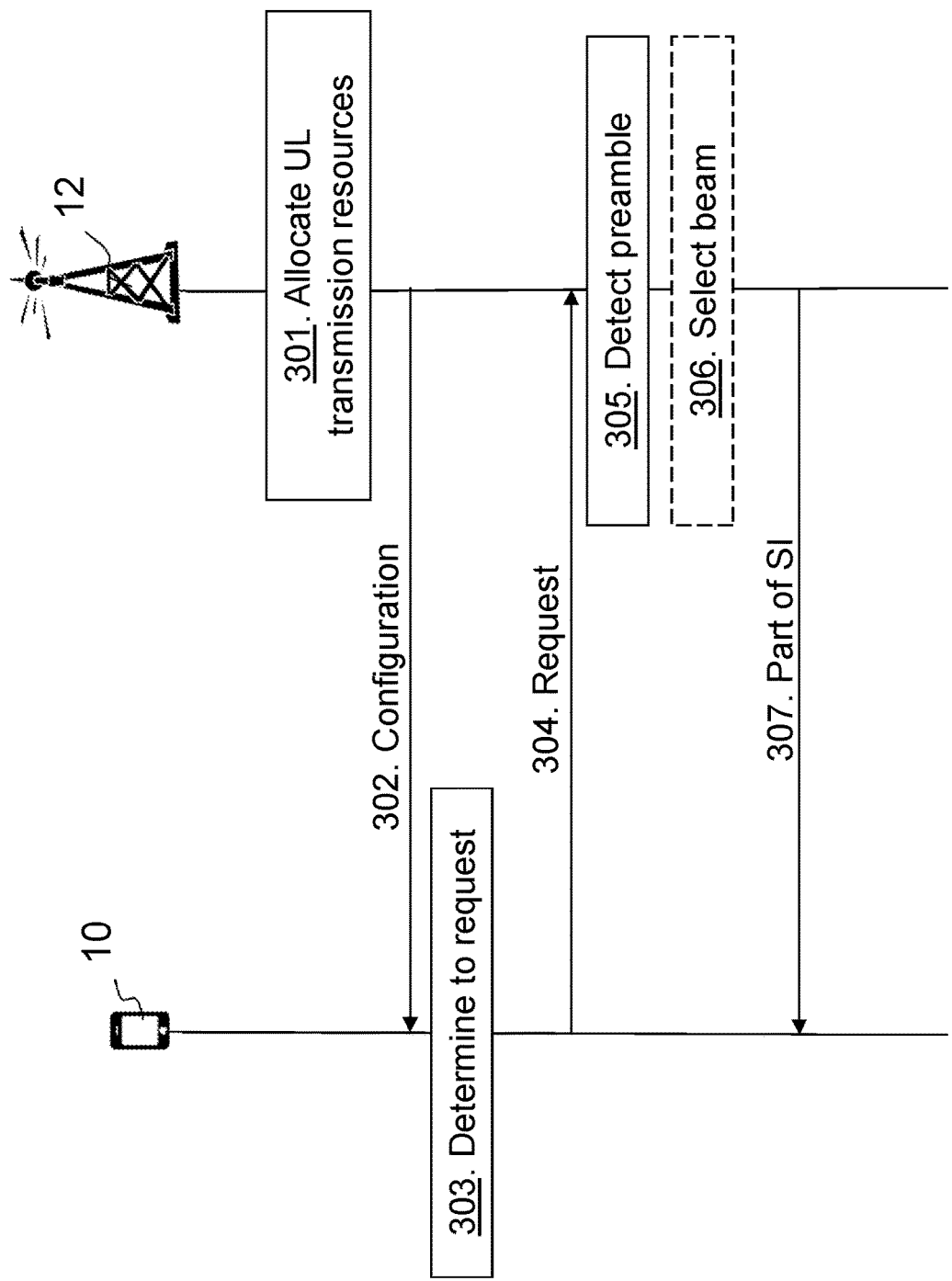
FIG. 3 is a combined flowchart and signalling scheme according to some embodiments herein.

FIG. 3 is a combined flowchart and signaling scheme according to some embodiments herein.

Action 301. The radio network node 12 allocates uplink transmission resources for requests relative, or in relation to, downlink transmission resources for the on-demand SI. The uplink transmission resources allocated for transmission of the request also denoted as an on-demand SI request, e.g. a preamble, either as the Msg1 solution or as a first message in the Msg3 method, may be regular PRACH resources, i.e. resources allocated for transmission of random access preambles as the first message of the random access procedure, or it may be uplink transmission resources allocated only for the purpose of transmissions of the request. Yet another alternative may be that uplink transmission resources are allocated only for requests of the at least part of SI, but the wireless device 10 is allowed to transmit the requests using either regular PRACH resources or the specially allocated resources.

In one embodiment, uplink transmission resources are allocated for transmission of requests of the at least part of SI. These uplink transmission resources may be regular PRACH resources or special, dedicated resources. These uplink transmission resources may typically be allocated with a recurrence period that is on the same timescale as PRACH resources or longer. Any wireless device can use these uplink transmission resources for transmission of requests of the at least part of SI.

In addition to these uplink transmission resources, other uplink transmission resources may be allocated for transmission of requests of the at least part of SI. However, the use of these other uplink transmission resources are restricted to certain wireless devices or certain situations/conditions, where the applied restrictions may be for certain wireless devices or certain conditions as described above.

If the radio network node 12 is capable, it may also schedule other uplink transmissions in the restricted resources, as described above.

Action 302. The radio network node 12 may transmit the configuration information to configure the wireless device 10 with e.g. scheduling information informing about the allocated resources for requesting the at least part of SI.

Action 303. The wireless device 10 may determine to request a quick and/or beamformed transmission of the at least part of SI also referred to as additional SI or other SI e.g. due to measured signal strength or quality being below a threshold.

Action 304. The wireless device 10 transmits the request on the allocated resources. The request may comprise an indication, such as a preamble, indicating that the request is for the at least part of SI and may indicate that the request is for a quick and/or a beamformed transmission of the at least part of SI.

Action 305. The radio network node 12 may then detect the indication e.g. the preamble indicating that the request is for the at least part of SI, quick and/or beamformed delivery of the at least part of SI.

Action 306. The radio network node 12 may, for beamformed delivery, then select beam for the wireless device 10 e.g. based on directional reciprocity.

Action 307. The radio network node 12 then transmits the requested SI to the wireless device using a quick transmission i.e. within the time interval, and/or a beamformed transmission as selected in action 306. It should be noted in case quick delivery is requested the radio network node 12 may detect the request and immediately, within the time interval, transmit the requested additional SI.

Figure 4:
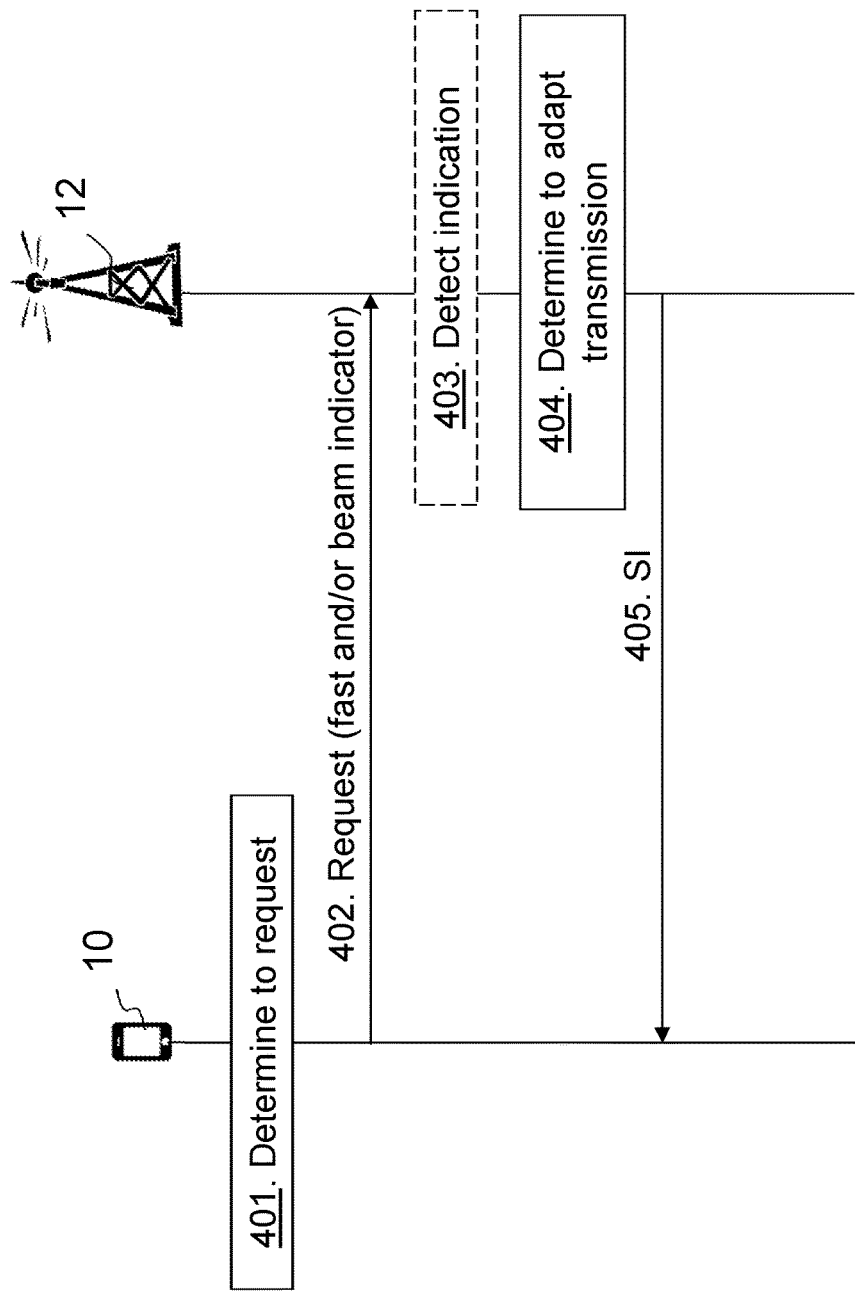
FIG. 4 is a combined flowchart and signalling scheme according to some embodiments herein.

FIG. 4 is a combined flowchart and signaling scheme according to some embodiments herein.

Action 401. The wireless device 10 may determine to request a part of SI for rapid (quick) and/or beamformed delivery. The request of requesting quick and/or beamformed transmission of the part of the SI may be restricted to certain wireless devices or certain conditions. This may be particularly useful to reduce the number of requests and deliveries when the feature can be used also for non-on-demand SI, i.e. for periodically broadcast SI. It may also be particularly useful when special uplink transmission resources are allocated for this purpose and the radio network node 12 also schedules other uplink transmissions in the same uplink transmission resources.

Example scenarios of the request of quick and/or beamformed transmission for the requested part of the SI may include:
  certain wireless device categories or wireless devices with certain capabilities.
  wireless devices with poor receiver equipment, including antenna(s), e.g. low cost/low complexity wireless devices such as MTC devices.
  wireless devices with certain requirements, e.g. URLLC wireless devices.
  wireless devices running certain applications or applications with certain requirements, e.g. URLLC applications or other delay sensitive applications.
  wireless devices requiring certain on-demand SIB(s) which is(are) related to a certain service (or services), which may be time sensitive.
  wireless devices experiences poor downlink radio channel quality, e.g. in terms of RSRP, SNR and/or SINR, e.g. wireless devices located at the cell edge.
  When the wireless device has failed to receive a certain number of regular periodic broadcasts of SI (or a certain part of the SI, such as certain SIB(s)).
  Various combinations of any of the above.

Action 402. The wireless device 10 transmits the request for the part of SI such as other SI and/or periodically transmitted SI. The request may comprise the indication, such as a preamble, indicating that the request is for the part of SI and may indicate that the request is for a quick and/or a beamformed transmission of the part of SI. Furthermore, which part of the SI may also be indicated.

Action 403. The radio network node 12 may then detect the indication indicating that the request is for the part of SI and that the request is for a quick and/or a beamformed transmission of the part of SI, and e.g. which part of the SI may also be detected.

Action 404. The radio network node 12 may then, based on the detected indication, determine to adapt transmission of the requested part of SI.

Action 405. The radio network node 12 then transmits e.g. in a subsequent subframe or one to three next sub-frames and/or in a beamformed transmission, using weights towards the wireless device 10, the part of the SI requested, to the wireless device 10.

Figure 5:
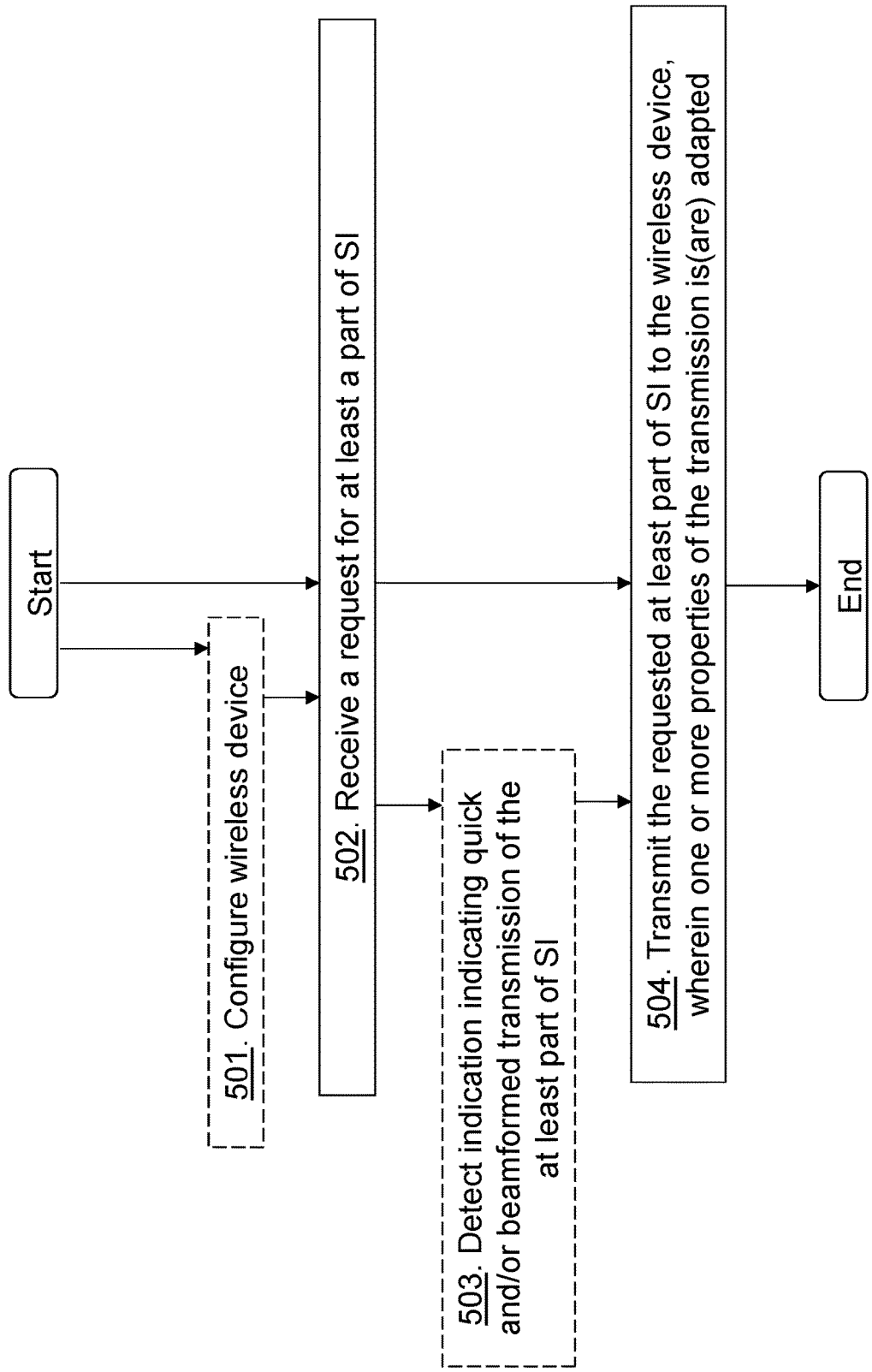
FIG. 5 is a flowchart depicting a method performed by a radio network node according to some embodiments herein.

Any combination of the embodiments in FIGS. 4 and 5 is also possible.

FIG. 5 shows an example of a method performed by the radio network node 12 for transmitting at least the part of the system information to the wireless device 10 located and/or served in the cell served by the radio network node 12.

Action 501. The radio network node 12 may configure the wireless device 10 with means for requesting transmission of the at least part of system information, wherein one or more properties of the transmission is(are) adapted to the request. E.g. the radio network node 12 may allocate uplink transmission resource for the request of the least the part of SI, which uplink transmission resource is allocated in relation to one or more uplink transmission resources for the least the part of SI.

Action 502. The radio network node 12 receives from the wireless device 10 the request for transmission of the at least part of the SI.

Action 503. The radio network node 12 may detect or determine indication indicating that the request is for the at least part of the SI and maybe quick and/or beamformed delivery.

Action 504. The radio network node 12 further transmits the requested at least part of SI to the wireless device 10, wherein one or more properties of the transmission is(are) adapted to the received request. The transmission may be beamformed towards the wireless device 10 and/or the transmission may be performed within a time interval from the received request. For example, the adaptation of the one or more transmission properties comprises transmitting the requested part(s) of the system information immediately, i.e. with short delay or within a set time interval being below a threshold such as three subframes from received request, after receiving the request. The adaptation of the one or more transmission properties may comprise beamforming the transmission in the direction from which the request was received.

Figure 6:
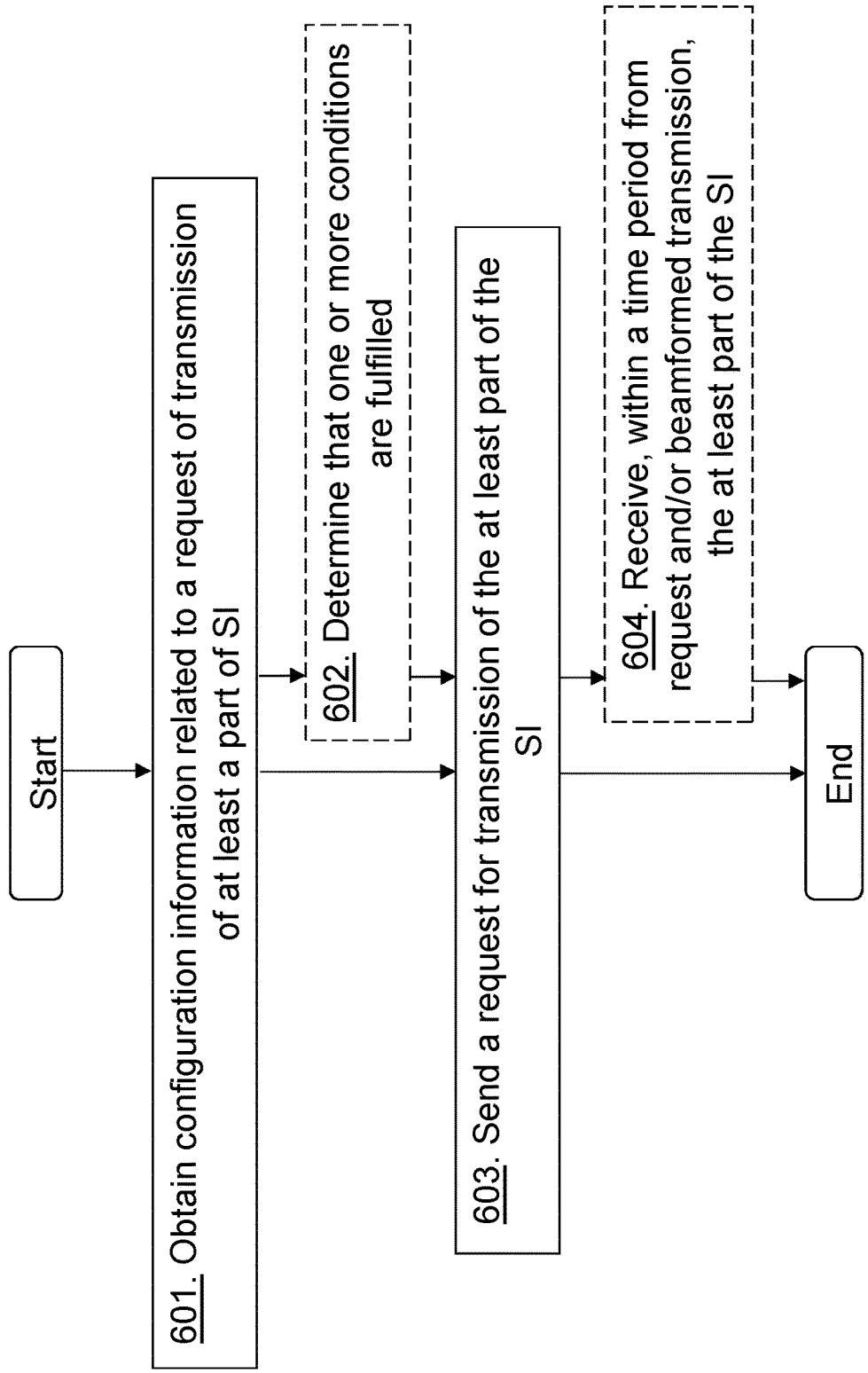
FIG. 6 is a flowchart depicting a method performed by a wireless device according to some embodiments herein.

A method is shown, in FIG. 6, performed by the wireless device 10 for retrieving system information (SI) from the radio network node, wherein the wireless device 10 is located in a cell served by the radio network node 12.

Action 601. The wireless device 10 may obtain configuration information related to request of transmission of at least a part of SI associated with the wireless communication network, e.g. SI available in the cell. The configuration information may comprise one or more conditions for allowing transmission of the request for the at least part of SI. The configuration information may further comprise allocated resources and/or indications, e.g. preamble, for indicating that the request is e.g. for quick and/or beamformed transmission of the at least part of the SI.

Action 602. The wireless device 10 may determine that the one or more conditions for sending a request for transmission of the at least part of SI associated with the wireless communication network 1 are fulfilled. For example, the wireless device 10 may determine that the one or more conditions are fulfilled when the wireless device 10 matches a set condition or a strength or quality or quality indication exceeds a threshold. The wireless device 10 may, thus, determine that the one or more conditions are fulfilled by concluding one or more of:

the wireless device's category matches a set category,
the wireless device's capability matches a set capability,
the wireless device 10 is running an application that matches a set application,
the at least part(s) of the system information the wireless device 10 intends to request match(es) a set part of the system information,
radio channel quality experienced by the wireless device 10 matches a set radio channel quality,
the wireless device 10 has failed to receive the at least part of SI or other system information transmissions a number of times that match or exceeds the set number of times.

Action 603. The wireless device 10 sends to the radio network node 12 the request for transmission of the at least part of system information associated with the wireless communication network e.g. in accordance with the configuration information. The requested at least part of system information comprises one or more part(s) of the system information which may be(are) only transmitted upon request in the cell. The requested at least part of system information comprises one or more part(s) of the system information, which may be(are) periodically transmitted in the cell.

Action 604. The wireless device 10 may then receive, within the time period from the request and/or a beamformed transmission from the radio network node 12, the at least part of the system information transmitted in response to the sent request.

Figure 7:
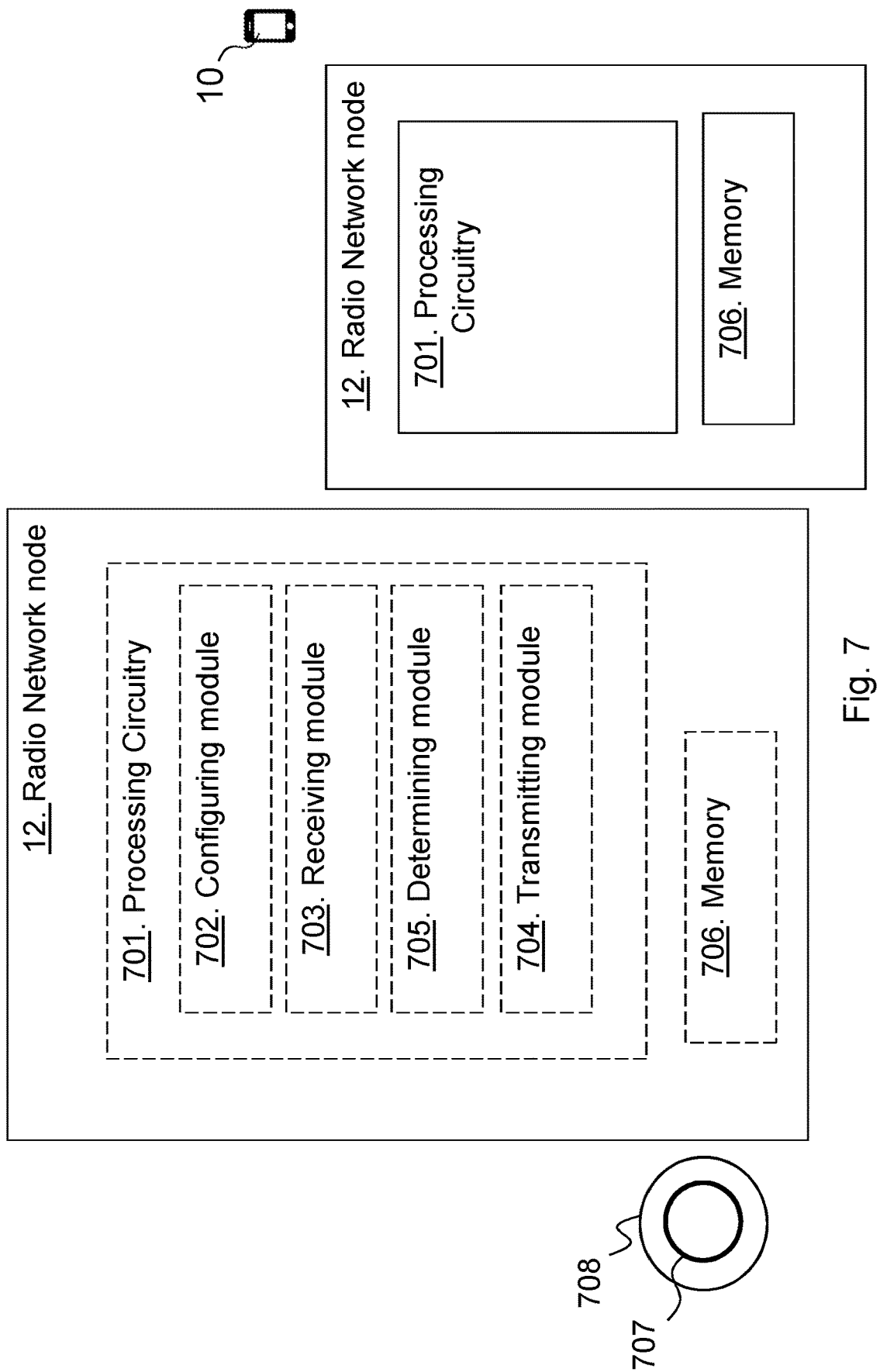
FIG. 7 is a schematic block diagram depicting a network node according to embodiments herein.

FIG. 7 is a schematic block diagram depicting the radio network node 12 for enabling communication e.g. providing at least part of the system information, for the wireless device 10 in the wireless communication network 1.

The radio network node 12 may comprise processing circuitry 701, e.g. one or more processors, configured to perform the methods herein.

The radio network node 12 may comprise a configuring module 702, e.g. a scheduler or similar. The radio network node 12, the processing circuitry 701, and/or the configuring module 702 may be configured to configure the wireless device with configuration information for requesting transmission of the at least part of system information, wherein one or more properties of the transmission are adapted to the request. E.g. the radio network node 12, the processing circuitry 701, and/or the configuring module 702 may be configured to configure the wireless device 10 with configuration data or means for requesting transmission of the at least part of system information, wherein one or more properties of the transmission is(are) adapted to the request. The radio network node 12, the processing circuitry 701, and/or the configuring module 702 may further be configured to configure the wireless device by allocating one or more uplink transmission resources for the request, which one or more uplink transmission resources are allocated in relation to one or more downlink transmission resources for the at least part of system information. E.g. the radio network node 12, the processing circuitry 701, and/or the configuring module 702 may be configured to allocate one or more uplink transmission resources for the request of on-demand SI, which uplink transmission resource is allocated in relation to one or more uplink transmission resources for the on-demand SI or part of SI. E.g. within a 0-2 subframes from the reception of the request.

The radio network node 12 may comprise a receiving module 703, e.g. a receiver, a transceiver or similar. The radio network node 12, the processing circuitry 701, and/or the receiving module 703 is configured to receive from the wireless device 10 the request for transmission of the at least part of the system information, wherein the request is associated with the indication indicating that the request is for a transmission of the at least part of the system information. The indication may be a radio resource indicating that the request is for a transmission of the at least part of the system information, or is indicating that the request is for a transmission of the at least part of the system information with a value. The indication may further indicate that the at least part of the system information is requested as transmitted beamformed and/or requested as delivered within the time interval.

The radio network node 12 may comprise a transmitting module 704, e.g. a transmitter, a transceiver, or similar. The radio network node 12, the processing circuitry 701, and/or the transmitting module 704 is configured to transmit, in a transmission, the requested at least part of the system information to the wireless device 10, wherein one or more properties of the transmission are adapted based on the received request; and wherein the transmission is beamformed towards the wireless device and/or the transmission is performed within a time interval from the received request. Thus, the requested at least part of the system information may be transmitted to the wireless device 10, wherein one or more properties of the transmission are adapted to the received request. For example, wherein the transmission is beamformed towards the wireless device 10 and/or the transmission is performed within a time interval from the received request. For example, the adaptation of the one or more transmission properties comprises transmitting the requested part(s) of the system information immediately, i.e. with short delay or within a set time interval being below a threshold such as three subframes from received request, after receiving the request. The adaptation of the one or more transmission properties may comprise beamforming the transmission in the direction from which the request was received. The radio network node 12, the processing circuitry 701, and/or the transmitting module 704 may be configured to adapt the one or more properties of the transmission to beamform the transmission in a direction from which the request was received.

The radio network node 12 may comprise a determining module 705. The radio network node 12, the processing circuitry 701, and/or the determining module 705 may be configured to detect or determine indication indicating that the request is for a transmission of the at least part of the system information. Optionally, it is also determined that the indication indicating that the request is for quick and/or beamformed delivery.

The radio network node 12 further comprises a memory 706 comprising one or more memory units. The memory 706 comprises instructions executable by the processing circuitry 701 to perform the methods herein when being executed in the radio network node 12. The memory 706 is arranged to be used to store e.g. information, data such as configurations, time intervals, scheduling information, beamforming parameters, SI, etc.

The methods according to the embodiments described herein for the radio network node 12 are respectively implemented by means of e.g. a computer program product 707 or a computer program, comprising instructions, i.e., software code portions, which, when executed on at least one processor, cause the at least one processor to carry out the actions described herein, as performed by the radio network node 12. The computer program product 707 may be stored on a computer-readable storage medium 708, e.g. a disc, a USB, or similar. The computer-readable storage medium 708, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium. Thus, the radio network node 12 may comprise the processing circuitry and the memory, said memory comprising instructions executable by said processing circuitry whereby said radio network node is operative to perform the methods herein.

Figure 8:
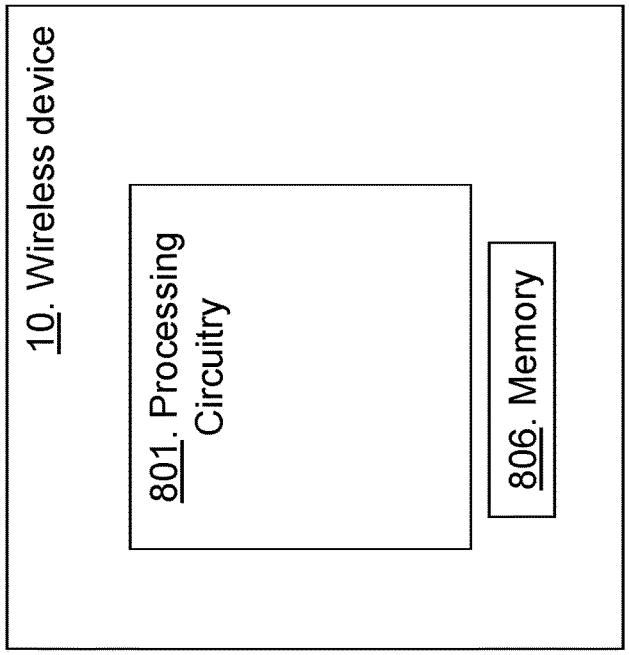
FIG. 8 is a schematic block diagram depicting a wireless device according to embodiments herein.
Figure 8:
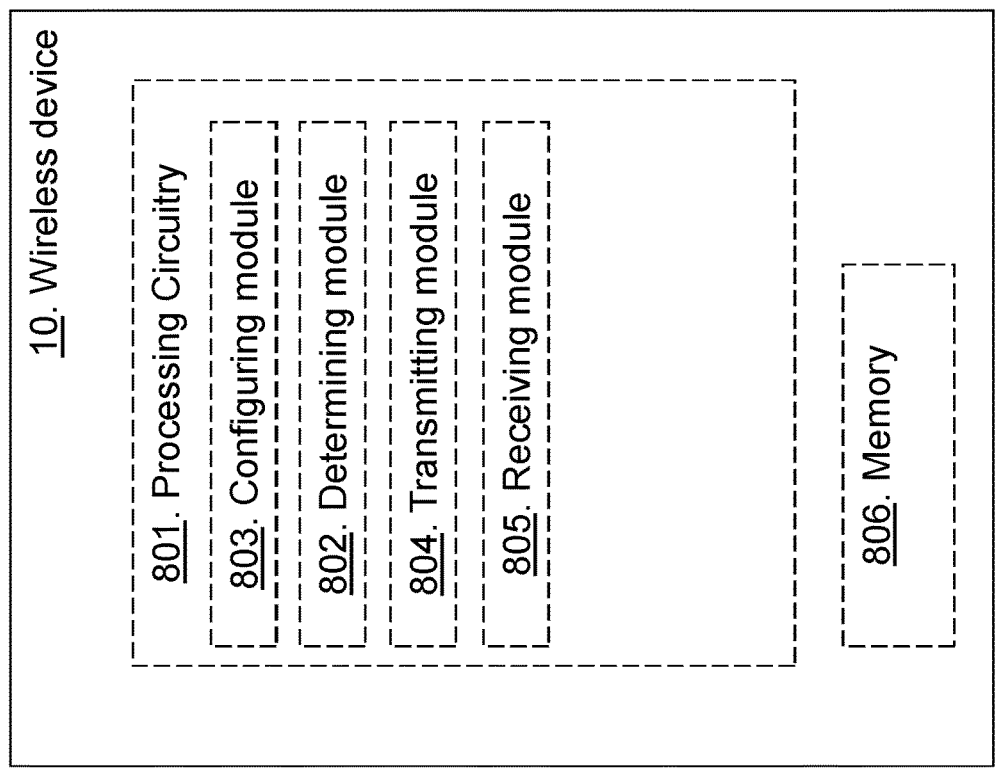
Figure 8:
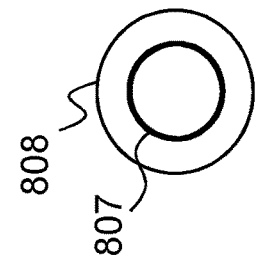

FIG. 8 is a schematic block diagram depicting the wireless device 10 for handling system information of the wireless communication network.

The wireless device 10 may comprise processing circuitry 801, e.g. one or more processors, configured to perform the methods herein.

The wireless device 10 may comprise a determining module 802. The wireless device 10, the processing circuitry 801, and/or the determining module 802 may be configured to determine whether to request for at least a part of SI from the radio network node 12. The wireless device 10, the processing circuitry 801, and/or the determining module 802 may be configured to determine that the one or more conditions are fulfilled when the wireless device matches a set condition or a strength or quality or quality indication exceeds a threshold. E.g. determine that the one or more conditions for sending a request for transmission of the at least part of system information associated with the wireless communication network are fulfilled. For example, the wireless device 10, the processing circuitry 801, and/or the determining module 802 may be configured to determine that the one or more conditions are fulfilled when the wireless device matches a set condition or a strength or quality or quality indication (number of attempts) exceeds a threshold. The wireless device 10, the processing circuitry 801, and/or the determining module 802 may be configured to determine that the one or more conditions are fulfilled by concluding one or more of:

the wireless device's category matches a set category,
the wireless device's capability matches a set capability,
the wireless device is running an application that matches a set application,
the at least part(s) of the system information the wireless device intends to request matches a set part of the system information,
radio channel quality experienced by the wireless device matches a set radio channel quality,
the wireless device has failed to receive the at least part of SI or other system information transmissions a number of times that match or exceeds the set number of times.

The wireless device 10 may comprise a configuring module 803. The wireless device 10, the processing circuitry 801, and/or the configuring module 803 is configured, from the radio network node 12 or be pre-configured, to obtain configuration information for requesting transmission of at least a part of the system information associated with the wireless communication network, e.g. obtain configuration information related to the request of transmission of at least a part of system information associated with the wireless communication network, e.g. SI available in the cell. The configuration information may comprise one or more conditions for allowing transmission of an on-demand request for the at least part of SI. The configuration information may further comprise allocation information of uplink transmission resources for the request.

The wireless device 10 may comprise a transmitting module 804, e.g. a transmitter, a transceiver or similar. The wireless device 10, the processing circuitry 801, and/or the transmitting module 804 is configured to send to the radio network node 12 a request for transmission of at least a part of system information associated with the wireless communication network, wherein the request is associated with an indication indicating that the request is for a transmission of the at least part of the system information. Thus, the wireless device 10, the processing circuitry 801, and/or the transmitting module 804 may be configured to send to the radio network node 12 the request for transmission of the at least part of system information associated with the wireless communication network e.g. in accordance with the configuration information. The requested at least part of system information may comprise one or more part(s) of the system information which is(are) only transmitted on request in the cell. The requested at least part of system information may comprise one or more part(s) of the system information, which is(are) periodically transmitted in the cell. The indication may be a radio resource indicating that the request is for a transmission of the at least part of the system information or is indicating that the request is for a transmission of the at least part of the system information with a value. The indication may further indicate that the at least part of the system information is requested as transmitted beamformed and/or requested as delivered within the time period. The request may be sent upon fulfillment of one or more conditions.

The wireless device 10 may comprise a receiving module 805, e.g. a receiver, a transceiver or similar. The wireless device 10, the processing circuitry 801, and/or the receiving module 805 is configured to receive within a time period from the request and/or a beamformed transmission from the radio network node, of the at least part of the system information transmitted in response to the sent request, e.g. receive within a time period from the request and/or a beamformed transmission from the radio network node 12 the at least part of the system information transmitted in response to the sent request.

The wireless device 10 further comprises a memory 806 comprising one or more memory units. The memory 806 comprises instructions executable by the processing circuitry 801 to perform the methods herein when being executed in the wireless device 10. The memory 806 is arranged to be used to store e.g. information, data such as configurations, request, SI, scheduling information, etc.

The methods according to the embodiments described herein for the wireless device 10 are respectively implemented by means of e.g. a computer program product 807 or a computer program, comprising instructions, i.e., software code portions, which, when executed on at least one processor, cause the at least one processor to carry out the actions described herein, as performed by the wireless device 10. The computer program product 807 may be stored on a computer-readable storage medium 808, e.g. a disc, a USB or similar. The computer-readable storage medium 808, having stored thereon the computer program program, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device is operative to perform the methods herein.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory. Other hardware, conventional and/or custom, may also be included. Designers of communications receivers will appreciate the cost, performance, and maintenance tradeoffs inherent in these design choices.

It is herein disclosed a method performed by a radio network node for handling system information of a wireless communication network. The radio network node receives from a wireless device a request for transmission of at least a part of the system information. The request is associated with an indication (using a resource indicating or indicating in itself) that the request is for quick and/or beamformed transmission of the at least part of the system information. The radio network node further transmits, in a transmission, the requested at least part of the system information to the wireless device, wherein one or more properties of the transmission are adapted based on the received request; wherein the transmission is beamformed towards the wireless device and/or the transmission is performed within a time interval from the received request.

It is herein disclosed a method performed by wireless device for handling system information of a wireless communication network. The wireless device obtain configuration information related to request of transmission of at least a part of the system information associated with the wireless communication network. The wireless device sends to the radio network node the request for transmission of the at least part of system information associated with the wireless communication network e.g. in accordance with the configuration information. The request is associated with an indication (using a resource indicating or indicating in itself) that the request is for quick and/or beamformed transmission of the at least part of the system information. The wireless device then receives, within a time period from the request and/or a beamformed transmission from the radio network node, the at least part of the system information transmitted in response to the sent request.

Figure 9:
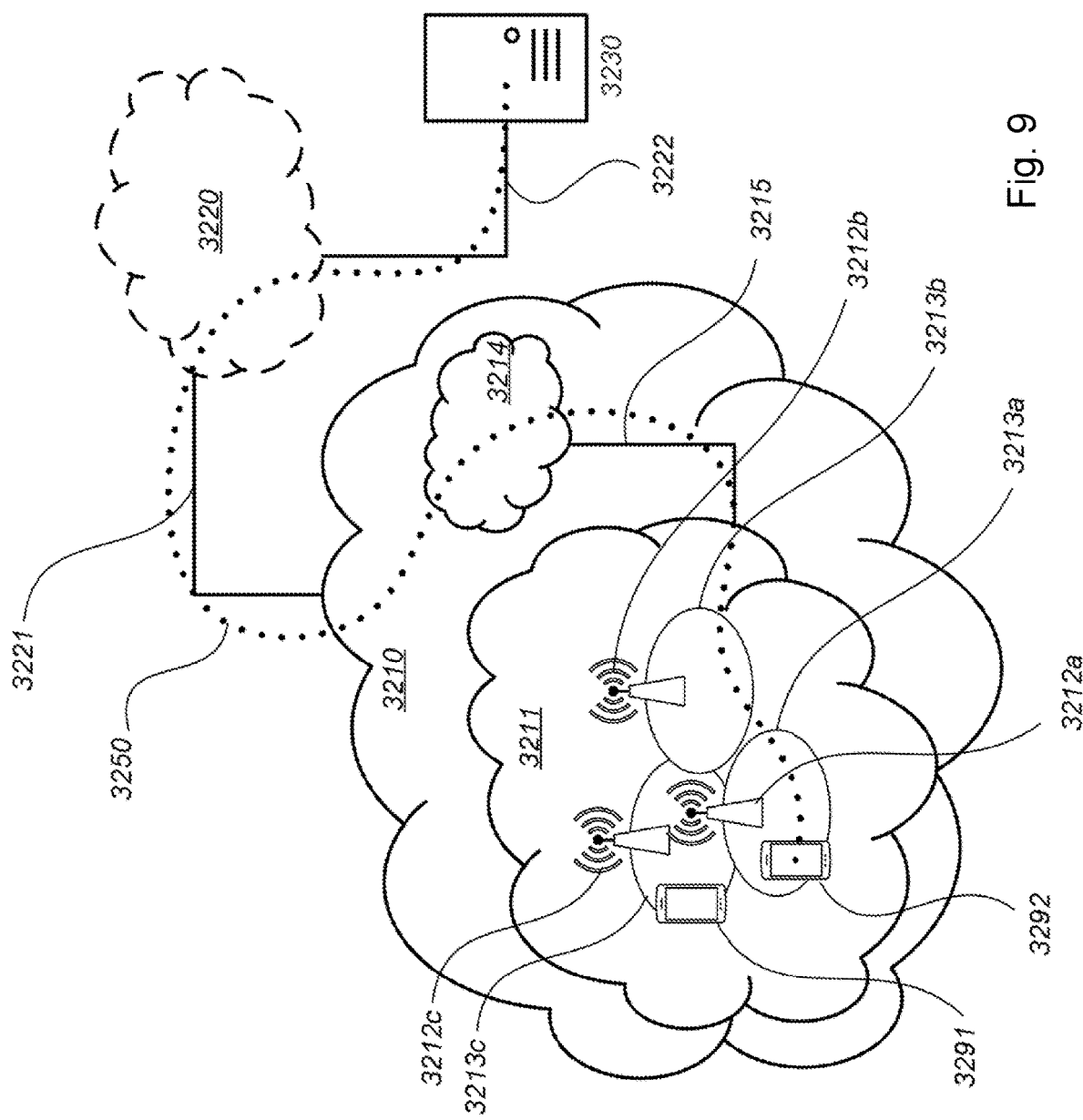
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
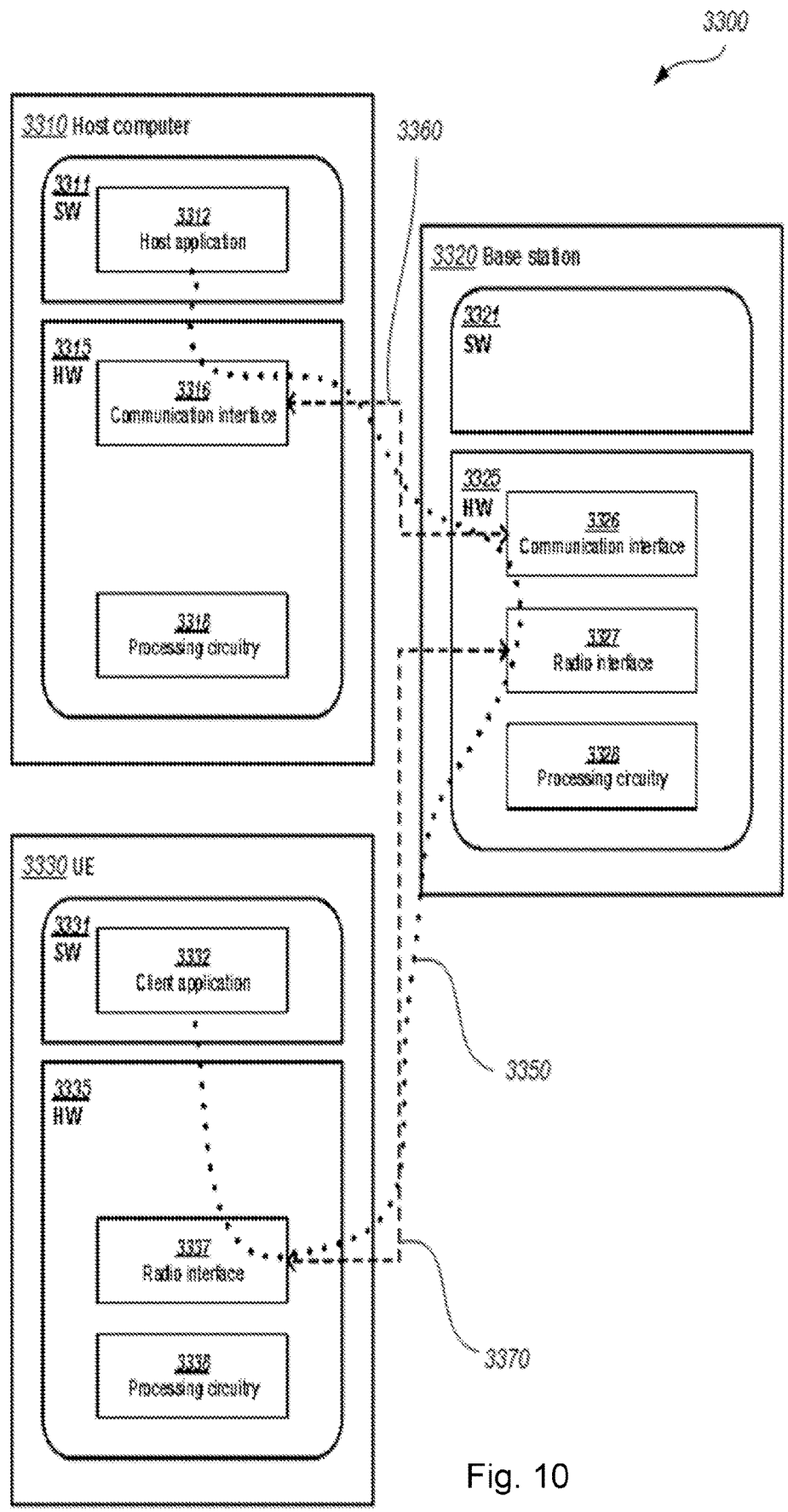
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency since the other SI is retrieved much quicker and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling system information associated with a wireless communication network, the method comprising:
  receiving, from a wireless device, a request for at least a part of the system information;
  based on the request, determining that broadcasting is unsuitable for delivering the requested part to the wireless device; and based on determining that broadcasting is unsuitable, transmitting the requested part to the wireless device according to one or more of the following:
- before a next occasion for the network node to broadcast an indication of on-demand delivery of the requested part, and
- beamformed in one or more directions from which the request was received.

2. The method according to claim 1, wherein:
the request indicates low-delay delivery of the requested part;
determining that broadcasting is unsuitable comprises determining that the requested part should be sent to the wireless device before the next occasion for broadcasting an indication of on-demand delivery of the requested part; and
the request part is transmitted to the wireless device during a first occasion before the next occasion.

3. The method according to claim 1, further comprising configuring the wireless device with configuration information relating to a request for transmission of the at least part of system information, wherein the request is received in accordance with the configuration information.

4. The method according to claim 3, wherein:
the configuration information indicates one or more uplink transmission resources allocated for requesting transmission of the at least part of the system information, and
the one or more uplink transmission resources are allocated in relation to one or more downlink transmission resources for the at least part of system information.

5. The method according to claim 1, wherein:
the request is received via an uplink (UL) beam formed by the network node;
the request indicates beamformed delivery of the requested part;
the requested part is transmitted in a downlink (DL) beam formed by the network node; and
the method further comprises determining the DL beam based on one of the following:
- selecting an existing DL beam corresponding to the UL beam; or
- calculating a set of DL beamforming weights optimized for the wireless device.

6. A radio network node for handling system information associated with a wireless communication network, wherein the radio network node comprises processing circuitry configured to:
receive, from a wireless device, a request for at least a part of the system information;
based on the request, determine that broadcasting is unsuitable for delivering the requested part to the wireless device; and
based on determining that broadcasting is unsuitable, transmit the requested part to the wireless device according to one or more of the following:
- before a next occasion for the network node to broadcast an indication of on-demand delivery of the requested part, and
- beamformed in one or more directions from which the request was received.

7. The radio network node according to claim 6, wherein:
the request indicates low-delay delivery of the requested part;
the processing circuitry is configured to determine that broadcasting is unsuitable based on determining that the requested part should be sent to the wireless device before the next occasion for broadcasting an indication of on-demand delivery of the requested part; and
the request part is transmitted to the wireless device during a first occasion before the next occasion.

8. The radio network node according to claim 6, wherein the processing circuitry is further configured to:
configure the wireless device with configuration information relating to a request for transmission of the at least part of system information; and
receive the request in accordance with the configuration information.

9. The radio network node according to claim 8, wherein:
the configuration information indicates one or more uplink transmission resources allocated for requesting transmission of the at least part of the system information, and
the one or more uplink transmission resources are allocated in relation to one or more downlink transmission resources for the at least part of system information.

10. The radio network node according to claim 6, wherein:
the request is received via an uplink (UL) beam formed by the network node;
the request indicates beamformed delivery of the requested part;
the requested part is transmitted in a downlink (DL) beam formed by the network node; and
the processing circuitry is further configured to determine the DL beam based on one of the following:
- selecting an existing DL beam corresponding to the UL beam; or
- calculating a set of DL beamforming weights optimized for the wireless device.

* * * * *